(12) United States Patent
Aoki et al.

(10) Patent No.: US 11,483,571 B2
(45) Date of Patent: *Oct. 25, 2022

(54) VIDEO DECODING DEVICE AND METHOD USING INVERSE QUANTIZATION

(71) Applicant: NEC CORPORATION, Tokyo (JP)

(72) Inventors: Hirofumi Aoki, Tokyo (JP); Keiichi Chono, Tokyo (JP); Yuzo Senda, Tokyo (JP); Kenta Senzaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/984,913

(22) Filed: Aug. 4, 2020

(65) Prior Publication Data

US 2020/0366904 A1 Nov. 19, 2020

Related U.S. Application Data

(63) Continuation of application No. 16/371,161, filed on Apr. 1, 2019, now Pat. No. 10,771,790, which is a (Continued)

(30) Foreign Application Priority Data

Mar. 9, 2011 (JP) ................................. 2011-051291
Apr. 21, 2011 (JP) ................................. 2011-095395

(51) Int. Cl.
*H04N 7/12* (2006.01)
*H04N 19/159* (2014.01)
(Continued)

(52) U.S. Cl.
CPC ......... *H04N 19/159* (2014.11); *H04N 19/124* (2014.11); *H04N 19/157* (2014.11); *H04N 19/196* (2014.11); *H04N 19/593* (2014.11)

(58) Field of Classification Search
CPC .. H04N 19/159; H04N 19/196; H04N 19/593; H04N 19/124; H04N 19/157;
(Continued)

(56) References Cited

U.S. PATENT DOCUMENTS 5,194,950 A * 3/1993 Murakami .............. G06T 9/008
375/240.16
5,384,849 A 1/1995 Jeong
(Continued)

FOREIGN PATENT DOCUMENTS

CA 2732218 A1 8/2011
CN 1378384 A 11/2002
(Continued)

OTHER PUBLICATIONS

Budagavi et al., "Delta QP signaling at sub-LCU level", Joint Collaborative Team on Video Coding (JCT-VC) of ITU-T SG16 WP3 and ISO/IEC JTC1/SC29/WG11, 4th Meeting: Daegu, KR, Jan. 20-28, 2011, Texas Instruments, Inc., 5 total pages, Document: JCTVC-D038.

(Continued)

*Primary Examiner* — Gims S Philippe
(74) *Attorney, Agent, or Firm* — Sughrue Mion, PLLC

(57) ABSTRACT

In a video decoding device, a quantization step size decoding unit calculates a quantization step size that controls a granularity of the inverse quantization by, based on an image prediction, selectively using a mean value of at least a quantization step size assigned to a leftwardly adjacent neighboring image block already decoded and a quantization step size assigned to a upwardly adjacent neighboring image block already decoded or a quantization step size assigned to an image block decoded immediately before.

2 Claims, 19 Drawing Sheets

Related U.S. Application Data continuation of application No. 13/984,951, filed as application No. PCT/JP2012/001592 on Mar. 8, 2012, now Pat. No. 10,284,859.

(51) Int. Cl.
*H04N 19/196* (2014.01)
*H04N 19/593* (2014.01)
*H04N 19/124* (2014.01)
*H04N 19/157* (2014.01)

(58) Field of Classification Search
CPC ...... H04N 19/44; H04N 19/119; H04N 19/13; H04N 19/176; H04N 19/40; H04N 19/103; H04N 19/50
USPC .................................................. 375/240.03
See application file for complete search history.

(56) References Cited

U.S. PATENT DOCUMENTS

| | | | |
|---|---|---|---|
| 5,600,764 A | 2/1997 | Kakutani | |
| 5,757,969 A | 5/1998 | Kim | |
| 5,845,016 A * | 12/1998 | Matsui | H03M 7/3082 382/253 |
| 5,852,682 A | 12/1998 | Kim | |
| 5,933,534 A * | 8/1999 | Yoshimoto | H04N 19/137 382/236 |
| 6,061,401 A | 5/2000 | Jung | |
| 6,144,700 A * | 11/2000 | Kim | G06T 5/002 375/240.03 |
| 6,363,113 B1 | 3/2002 | Faryar et al. | |
| 6,477,276 B1 * | 11/2002 | Inoue | H04N 1/32165 382/232 |
| 6,590,936 B1 | 7/2003 | Kadono | |
| 6,738,428 B1 | 5/2004 | Nagatomo | |
| 6,782,135 B1 | 8/2004 | Viscito et al. | |
| 6,795,501 B1 | 9/2004 | Zhu | |
| 7,321,323 B2 | 1/2008 | Sekiguchi | |
| 8,295,346 B2 | 10/2012 | Zhou | |
| 2002/0080377 A1 | 6/2002 | Tonami et al. | |
| 2003/0123228 A1 | 7/2003 | Bhatia | |
| 2005/0063461 A1 | 3/2005 | Lee et al. | |
| 2005/0169547 A1 | 8/2005 | Mihara | |
| 2005/0201629 A1 | 9/2005 | Karczewicz et al. | |
| 2005/0238096 A1 | 10/2005 | Holcomb et al. | |
| 2006/0018552 A1 | 1/2006 | Malayath et al. | |
| 2008/0046233 A1 | 2/2008 | Chen | |
| 2008/0317111 A1 | 12/2008 | Davis | |
| 2009/0010557 A1 | 1/2009 | Zheng et al. | |
| 2009/0213930 A1 | 8/2009 | Ye et al. | |
| 2009/0296808 A1 | 12/2009 | Regunathan et al. | |
| 2010/0020872 A1 | 1/2010 | Shimizu et al. | |
| 2013/0034159 A1 | 2/2013 | Siekmann | |
| 2013/0077871 A1 * | 3/2013 | Lu | H04N 19/61 382/197 |
| 2013/0101032 A1 | 4/2013 | Wittmann et al. | |
| 2013/0329811 A1 | 12/2013 | Breiling et al. | |

FOREIGN PATENT DOCUMENTS

| | | |
|---|---|---|
| CN | 101589625 A | 10/2006 |
| CN | 1926880 A | 3/2007 |
| CN | 1998152 A | 7/2007 |
| CN | 101039432 A | 9/2007 |
| CN | 101171842 A | 4/2008 |
| CN | 101252689 A | 8/2008 |
| CN | 101578875 A | 11/2009 |
| CN | 101605250 A | 12/2009 |
| CN | 101637026 A | 1/2010 |
| CN | 101946516 A | 1/2011 |
| CN | 103428497 A | 12/2013 |
| EP | 0542288 B1 | 8/1997 |
| EP | 1615444 A2 | 1/2006 |
| EP | 1727371 A1 | 11/2006 |
| JP | 05-137132 A | 6/1993 |
| JP | 3012698 B2 | 2/2000 |
| JP | 2007-235291 A | 9/2007 |
| JP | 4613909 B2 | 1/2011 |
| JP | 2013-034037 A | 2/2013 |
| KR | 20100120691 A | 11/2010 |
| RU | 2345503 C1 | 1/2009 |
| RU | 2407221 C1 | 12/2010 |
| WO | 2006072894 A2 | 7/2006 |
| WO | 2006/099229 A1 | 9/2006 |
| WO | 2009/105732 A1 | 8/2009 |
| WO | 2009/158113 A2 | 12/2009 |
| WO | 2011/156458 A1 | 12/2011 |
| WO | 2012/023806 A2 | 2/2012 |
| WO | 2013/003284 A1 | 1/2013 |

OTHER PUBLICATIONS

Communication dated Feb. 27, 2018, issued by the Japanese Patent Office in counterpart Japanese application No. 2017-073515.
"Information technology—Coding of audio-visual objects—Part 10: Advanced Video Coding", ISO/IEC 14496-10, May 15, 2009, 16 pages, Fifth Edition.
Extended European Search Report dated Apr. 2, 2015, issued by the European Patent Office in counterpart European application No. 15151220.9.
Communication dated Dec. 9, 2014, issued by the Russian Patent Office in corresponding Russian Application No. 2013145077/08.
Communication dated Nov. 7, 2018 in Canadian Intellectual Property Office in counterpart application No. 2909242.
Communication dated Feb. 22, 2016, from the State Intellectual Property Office in counterpart application No. 201280012218.8.
Communication dated Nov. 27, 2014, issued by the Korean Intellectual Property Office in counterpart Korean application No. 10-2013-7020857.
Communication dated Aug. 11, 2014, issued by the European Patent Office in corresponding Application No. 12755202.4.
Communication dated Nov. 17, 2015 from the Japanese Patent Office in counterpart application No. 2013-503397.
Communication dated Jul. 19, 2018 from the State Intellectual Property Office of the P.R.C. in counterpart Chinese application No. 201710448815.X.
Extended European Search Report dated Mar. 31, 2015, issued by the European Patent Office in counterpart European application No. 15151219.1.
Aoki et al., "CE4 Subtest 2: QP prediction based on intra prediction (test2.3.g)", Joint Collaborative Team on Video Coding (JCT-VC) of ITU-T SG16 WP3 and ISO/IEC JTC1/SC29/WG11, 6th Meeting: Torino, IT, Jul. 14-22, 2011, NEC Corporation & Canon Inc., 9 total pages, Document: JCTVC-F159.
Thomas Wiegand, "WD1: Working Draft 1 of High-Efficiency Video Coding", Document JCTVC_C403, Joint Collaborative Team on Video Coding (JCT-VC) of ITU-T SG16 WP3 and ISO/IEC JTC1/SC29/WG11 3rd Meeting at Guangzhou, China, Oct. 2010, 4 pages.
Letter from Canadian associate showing the receipt of Canadian Office Action.
Hirofumi Aoki, et al., "Prediction-based QP derivation", Joint Collaborative Team on Video Coding (JCT-VC) of ITU-T SG16 WP3 and ISO/IEC JTC1/SC29/WG11 JVT E215, Mar. 16, 2011, pp. 1-11.
Kobayashi et al., "Sub-LCU level delta QP signaling", Joint Collaborative Team on Video Coding (JCT-VC) of ITU-T SG16 WP3 and ISO/IEC JTC1/SC29/WG11, 5th Meeting: Geneve, CH, Mar. 16-23, 2011, Canon Inc., 9 total pages, Document: JCTVC-E198.
Communication dated Dec. 5, 2016, issued by the Russian Patent Office in corresponding Russian Application No. 2015121760/08.
Communication dated Nov. 1, 2017 from the Russian Patent Office in counterpart Application No. 2017119468/08.
Communication dated Jul. 1, 2019 issued by the Chinese Patent Office in corresponding Application No. 201710448272.1.

(56) References Cited

OTHER PUBLICATIONS

Karczewicz M et al., "R-D optimized quantization", 27. JVT Meeting; Apr. 6, 2008-Apr. 10, 2008; Geneva, ; (Joint Video Team OFISO/IECJTCI/SC29/WG11 and ITU-T SG.16), No. JVT-AA026, Apr. 19, 2008, XP030007369, 8 total pages.

"Working Draft No. 2, Revision 2 (WD-2)", Joint Video Team (JVT) of ISO/IEC MPEG and ITU-T VCEG, Geneva, Switzerland, Jan. 29-Feb. 1, 2002, 106 total pages, Document JVT-B118r2.

Communication dated May 24, 2018, issued by the Intellectual Property Office of India in corresponding Indian Application No. 7019/CHENP/2013.

Communication dated Jul. 23, 2018 from the Russian Patent Office in counterpart Russian application No. 2018115678/07.

Chao Pang, et al., "Improved dQP calculation method",Joint Collaborative Team on Video Coding (JCT-VC) of ITU-T SG16 WP3 and ISO/IEC JTC1/SC29/WG11: pp. 1-3, Mar. 2011, URL,http://phenix.int-evry.fr/jct/doc_end_user/current_document.php?id=2145.

Communication dated Oct. 4, 2016 from the Russian Patent and Trademark Office in counterpart application No. 2015121683/08.

Communication dated Jan. 30, 2019, from the State Intellectual Property Office of the P.R.C in counterpart application No. 2017104487246.

Communication dated Jan. 18, 2017, from the Canadian Patent Office in counterpart application No. 2,909,242.

Communication dated May 29, 2019 from the State Intellectual Property Office of the P.R.C. in counterpart Application No. 201710448723.1.

Communication dated Mar. 11, 2020 from the State Intellectual Property Office of the P.R.C. in application No. 201710448272.1.

International Search Report for PCT/JP2012/001592, dated May 29, 2012.

U.S. Office Action and PTO-892 for U.S. Appl. No. 16/984,856 dated Jun. 21, 2021.

U.S. Office Action for U.S. Appl. No. 16/984,957 dated Jul. 26, 2021.

U.S. Office Action and PTO-892 for U.S. Appl. No. 16/984,957 dated Jan. 4, 2022.

* cited by examiner

| slice_header() { | C | Descriptor |
|---|---|---|
| ... | | |
| temporal_qp_pred_flag | 2 | u(1) |
| if( temporal_qp_pred_flag ) { | | |
| for( i=0; i <=num_ref_idx_l0_active_minus1; i++ ) { | | |
| qp_pred_offset[i] | 2 | se(v) |
| } | | |
| for( i=0; i <=num_ref_idx_l1_active_minus1; i++ ) { | | |
| qp_pred_offset[i] | 2 | se(v) |
| } | | |
| } | | |
| ... | | |
| } | | |

VIDEO DECODING DEVICE AND METHOD USING INVERSE QUANTIZATION

This application is a Continuation of U.S. application Ser. No. 16/371,161, filed Apr. 1, 2019, which is a Continuation of U.S. application Ser. No. 13/984,951, filed Aug. 12, 2013, which is a National Stage of International Application No. PCT/JP2012/001592 filed Mar. 8, 2012, claiming priority based on Japanese Patent Application Nos. 2011-051291, filed Mar. 9, 2011 and 2011-095395, filed Apr. 21, 2011, the contents of all of which are incorporated herein by reference in their entirety.

TECHNICAL FIELD

The present invention relates to a video encoding technique, and particularly to a video encoding technique which makes a prediction with reference to a reconstructed image and performs data compression by quantization.

BACKGROUND ART

A typical video encoding device executes an encoding process that conforms to a predetermined video coding scheme to generate coded data, i.e. a bitstream. In ISO/IEC 14496-10 Advanced Video Coding (AVC) described in Non Patent Literature (NPL) 1 as a representative example of the predetermined video coding scheme, each frame is divided into blocks of 16×16 pixel size called MBs (Macro Blocks), and each MB is further divided into blocks of 4×4 pixel size, setting MB as the minimum unit of encoding. FIG. 23 shows an example of block division in the case where the color format of a frame is the YCbCr 4:2:0 format and the spatial resolution is QCIF (Quarter Common Intermediate Format).

Each of the divided image blocks is input sequentially to the video encoding device and encoded. FIG. 24 is a block diagram showing an example of the structure of the typical video encoding device for generating a bitstream that conforms to AVC. Referring to FIG. 24, the structure and operation of the typical video encoding device is described below.

The video encoding device shown in FIG. 24 includes a frequency transformer 101, a quantizer 102, a variable-length encoder 103, a quantization controller 104, an inverse quantizer 105, an inverse frequency transformer 106, a frame memory 107, an intra-frame predictor 108, an inter-frame predictor 109, and a prediction selector 110.

An input image to the video encoding device is input to the frequency transformer 101 as a prediction error image, after a prediction image supplied from the intra-frame predictor 108 or the inter-frame predictor 109 through the prediction selector 110 is subtracted from the input image.

The frequency transformer 101 transforms the input prediction error image from a spatial domain to a frequency domain, and outputs the result as a coefficient image.

The quantizer 102 quantizes the coefficient image supplied from the frequency transformer 101 using a quantization step size, supplied from the quantization controller 104, controlling the granularity of quantization, and outputs the result as a quantized coefficient image.

The variable-length encoder 103 entropy-encodes the quantized coefficient image supplied from the quantizer 102. The variable-length encoder 103 also encodes the above quantization step size supplied from the quantization controller 104 and an image prediction parameter supplied from the prediction selector 110. These pieces of coded data are multiplexed and output from the video encoding device as a bitstream.

Here, an encoding process for the quantization step size at the variable-length encoder 103 is described with reference to FIG. 25. In the variable-length encoder 103, a quantization step size encoder for encoding the quantization step size includes a quantization step size buffer 10311 and an entropy encoder 10312 as shown in FIG. 25.

The quantization step size buffer 10311 holds a quantization step size $Q(i-1)$ assigned to the previous image block encoded immediately before an image block to be encoded.

As shown in the following equation (1), the previous quantization step size $Q(i-1)$ supplied from the quantization step size buffer 10311 is subtracted from an input quantization step size $Q(i)$, and the result is input to the entropy encoder 10312 as a difference quantization step size $dQ(i)$.

$$dQ(i)=Q(i)-Q(i-1) \quad (1)$$

The entropy encoder 10312 entropy-encodes the input difference quantization step size $dQ(i)$, and outputs the result as code corresponding to the quantization step size.

The above has described the encoding process for the quantization step size.

The quantization controller 104 determines a quantization step size for the current input image block. In general, the quantization controller 104 monitors the output code rate of the variable-length encoder 103 to increase the quantization step size so as to reduce the output code rate for the image block concerned, or, conversely, to decrease the quantization step size so as to increase the output code rate for the image block concerned. The increase or decrease in quantization step size enables the video encoding device to encode an input moving image by a target rate. The determined quantization step size is supplied to the quantizer 102 and the variable-length encoder 103.

The quantized coefficient image output from the quantizer 102 is inverse-quantized by the inverse quantizer 105 to obtain a coefficient image to be used for prediction in encoding subsequent image blocks. The coefficient image output from the inverse quantizer 105 is set back to the spatial domain by the inverse frequency transformer 106 to obtain a prediction error image. The prediction image is added to the prediction error image, and the result is input to the frame memory 107 and the intra-frame predictor 108 as a reconstructed image.

The frame memory 107 stores reconstructed images of encoded image frames input in the past. The image frames stored in the frame memory 107 are called reference frames.

The intra-frame predictor 108 refers to reconstructed images of image blocks encoded in the past within the image frame being currently encoded to generate a prediction image.

The inter-frame predictor 109 refers to reference frames supplied from the frame memory 107 to generate a prediction image.

The prediction selector 110 compares the prediction image supplied from the intra-frame predictor 108 with the prediction image supplied from the inter-frame predictor 109, selects and outputs one prediction image closer to the input image. The prediction selector 110 also outputs information (called an image prediction parameter) on a prediction method used by the intra-frame predictor 108 or the inter-frame predictor 109, and supplies the information to the variable-length encoder 103.

According to the processing mentioned above, the typical video encoding device compressively encodes the input moving image to generate a bitstream.

The output bitstream is transmitted to a video decoding device. The video decoding device executes a decoding process so that the bitstream will be decompressed as a moving image. FIG. 26 shows an example of the structure of a typical video decoding device that decodes the bitstream output from the typical video encoding device to obtain decoded video. Referring to FIG. 26, the structure and operation of the typical video decoding device is described below.

The video decoding device shown in FIG. 26 includes a variable-length decoder 201, an inverse quantizer 202, an inverse frequency transformer 203, a frame memory 204, an intra-frame predictor 205, an inter-frame predictor 206, and a prediction selector 207.

The variable-length decoder 201 variable-length-decodes the input bitstream to obtain a quantization step size that controls the granularity of inverse quantization, the quantized coefficient image, and the image prediction parameter. The quantization step size and the quantized coefficient image mentioned above are supplied to the inverse quantizer 202. The image prediction parameter is supplied to the prediction selector 207.

The inverse quantizer 202 inverse-quantizes the input quantized coefficient image based on the input quantization step size, and outputs the result as a coefficient image.

The inverse frequency transformer 203 transforms the coefficient image, supplied from the inverse quantizer 202, from the frequency domain to the spatial domain, and outputs the result as a prediction error image. A prediction image supplied from the prediction selector 207 is added to the prediction error image to obtain a decoded image. The decoded image is not only output from the video decoding device as an output image, but also input to the frame memory 204 and the intra-frame predictor 205.

The frame memory 204 stores image frames decoded in the past. The image frames stored in the frame memory 204 are called reference frames.

Based on the image prediction parameter supplied from the variable-length decoder 201, the intra-frame predictor 205 refers to reconstructed images of image blocks decoded in the past within the image frame being currently decoded to generate a prediction image.

Based on the image prediction parameter supplied from the variable-length decoder 201, the inter-frame predictor 206 refers to reference frames supplied from the frame memory 204 to generate a prediction image.

The prediction selector 207 selects either of the prediction images supplied from the intra-frame predictor 205 and the inter-frame predictor 206 based on the image prediction parameter supplied from the variable-length decoder 201.

Here, a decoding process for the quantization step size at the variable-length decoder 201 is described with reference to FIG. 27. In the variable-length decoder 201, a quantization step size decoder for decoding the quantization step size includes an entropy decoder 20111 and a quantization step size buffer 20112 as shown in FIG. 27.

The entropy decoder 20111 entropy-decodes input code, and outputs a difference quantization step size dQ(i).

The quantization step size buffer 20112 holds the previous quantization step size Q(i−1).

As shown in the following equation (2), Q(i−1) supplied from the quantization step size buffer 20112 is added to the difference quantization step size dQ(i) generated by the entropy decoder 20111. The added value is not only output as a quantization step size Q(i), but also input to the quantization step size buffer 20112.

$$Q(i)=Q(i-1)+dQ(i) \quad (2)$$

The above has described the decoding process for the quantization step size.

According to the processing mentioned above, the typical video decoding device decodes the bitstream to generate a moving image.

In the meantime, in order to maintain the subjective quality of the moving image to be compressed by the encoding process, the quantization controller 104 in the typical video encoding device is generally analyzes either or both of the input image and the prediction error image, as well as analyzing the output code rate, to determine a quantization step size according to the human visual sensitivity. In other words, the quantization controller 104 performs visual-sensitivity-based adaptive quantization. Specifically, when the human visual sensitivity to the current image to be encoded is determined to be high, the quantization step size is set small, while when the visual sensitivity is determined to be low, the quantization step size is set large. Since such control can assign a larger code rate to a low visual sensitivity region, the subjective quality is improved.

As a visual-sensitivity-based adaptive quantization technique, for example, adaptive quantization based on the texture complexity of an input image used in MPEG-2 Test Model 5 (TM5) is known. The texture complexity is typically called activity. Patent Literature (PTL) 1 proposes an adaptive quantization system using the activity of a prediction image in conjunction with the activity of an input image. PTL 2 proposes an adaptive quantization system based on an activity that takes edge portions into account.

When the visual-sensitivity-based adaptive quantization technique is used, it will cause a problem if the quantization step size is often changed within an image frame. In the typical video encoding device for generating a bitstream that confirms to the AVC scheme, a difference from a quantization step size for an image block encoded just before an image block to be encoded is entropy-encoded in encoding the quantization step size. Therefore, as the change in quantization step size in the encoding sequence direction becomes large, the rate required to encode the quantization step size increases. As a result, the code rate assigned to encoding of the coefficient image is relatively reduced, and hence the image quality is degraded.

Since the encoding sequence direction is independent of the continuity of the visual sensitivity on the screen, the visual-sensitivity-based adaptive quantization technique inevitably increases the code rate required to encode the quantization step size. Therefore, even using the visual-sensitivity-based adaptive quantization technique in the typical video encoding device, the image degradation associated with the increase in the code rate for the quantization step size may cancel out the subjective quality improved by the adaptive quantization technique, i.e., there arises a problem that a sufficient improvement in image quality cannot be achieved.

To address this problem, PTL 3 discloses a technique for adaptively setting a range of quantization to zero, i.e. a dead zone according to the visual sensitivity in the spatial domain and the frequency domain instead of adaptively setting the quantization step size according to the visual sensitivity. In the system described in PTL 3, a dead zone for a transform coefficient determined to be low in terms of the visual sensitivity is more widened than a dead zone for a transform coefficient determined to be high in terms of the visual sensitivity. Such control enables visual-sensitivity-based adaptive quantization without changing the quantization step size.

CITATION LIST

Patent Literatures

PTL 1: Japanese Patent No. 2646921
PTL 2: Japanese Patent No. 4529919
PTL 3: Japanese Patent No. 4613909

Non Patent Literatures

NPL 1: ISO/IEC 14496-10 Advanced Video Coding NPL 2: "WD1: Working Draft 1 of High-Efficiency Video Coding," Document JCTVC-C403, Joint Collaborative Team on Video Coding (JCT-VC) of ITU-T SG16 WP3 and ISO/IEC JTC1/SC29/WG11 3rd Meeting at Guangzhou, China, October 2010

SUMMARY OF INVENTION

Technical Problem

However, when the technique described in PTL 3 is used, quantization adaptive to the visual sensitivity cannot be performed on transform coefficients that do not fall within a dead zone. In other words, even when the visual sensitivity is determined to be low, the rate of coefficient code for the transform coefficients that do not fall within the dead zone cannot be reduced. Further, when the quantization step size is enlarged, the transform coefficient values after being subjected to quantization are concentrated near zero, while when the dead zone is widened, the transform coefficients that do not fall within the dead zone are not concentrated near zero even after being subjected to quantization. In other words, when the dead zone is widened, the entropy-encoding efficiency is insufficient compared with the case where the quantization step size is enlarged. For these reasons, it can be said that there is a problem in typical encoding technology that the assignment of the code rate to a high visual sensitivity region cannot be increased sufficiently.

The present invention has been made in view of the above problems, and it is a first object thereof to provide a video encoding device and a video encoding method capable of changing the quantization step size frequently while suppressing an increase in code rate to achieve high-quality moving image encoding. It is a second object of the present invention to provide a video decoding device and a video decoding method capable of regenerating a high-quality moving image.

Solution to Problem

A video encoding device according to the present invention for dividing input image data into blocks of a predetermined size, and applying quantization to each divided image block to execute a compressive encoding process, comprises quantization step size encoding means for encoding a quantization step size that controls a granularity of the quantization, wherein the quantization step size encoding means predicts the quantization step size that controls the granularity of the quantization by using a quantization step size assigned to a neighboring image block already encoded.

A video decoding device according to the present invention for decoding image blocks using inverse quantization of input compressed video data to execute a process of generating image data as a set of image blocks, comprises quantization step size decoding means for decoding a quantization step size that controls a granularity of the inverse quantization, wherein the quantization step size decoding means predicts the quantization step size that controls the granularity of the inverse quantization by using a quantization step size assigned to a neighboring image block already decoded.

A video encoding method according to the present invention for dividing input image data into blocks of a predetermined size, and applying quantization to each divided image block to execute a compressive encoding process, comprises predicting a quantization step size that controls a granularity of the quantization by using a quantization step size assigned to a neighboring image block already encoded.

A video decoding method according to the present invention for decoding image blocks using inverse quantization of input compressed video data to execute a process of generating image data as a set of image blocks, comprises predicting a quantization step size that controls a granularity of the inverse quantization by using a quantization step size assigned to a neighboring image block already decoded.

Advantageous Effects of Invention

According to the present invention, even when the quantization step size is changed frequently within an image frame, the video encoding device can suppress an increase in code rate associated therewith. In other words, the quantization step size can be encoded by a smaller code rate. This resolves the problem that the subjective quality improved by the visual-sensitivity-based adaptive quantization is canceled out, that is, high-quality moving image encoding can be achieved. Further, according to the present invention, since the video decoding device can decode the quantization step size frequently changed by receiving only a small code rate, a high-quality moving image can be regenerated by the small code rate.

DESCRIPTION OF EMBODIMENTS

Exemplary embodiments of the present invention are described below with reference to the accompanying drawings.

Exemplary Embodiment 1

Figure 24:
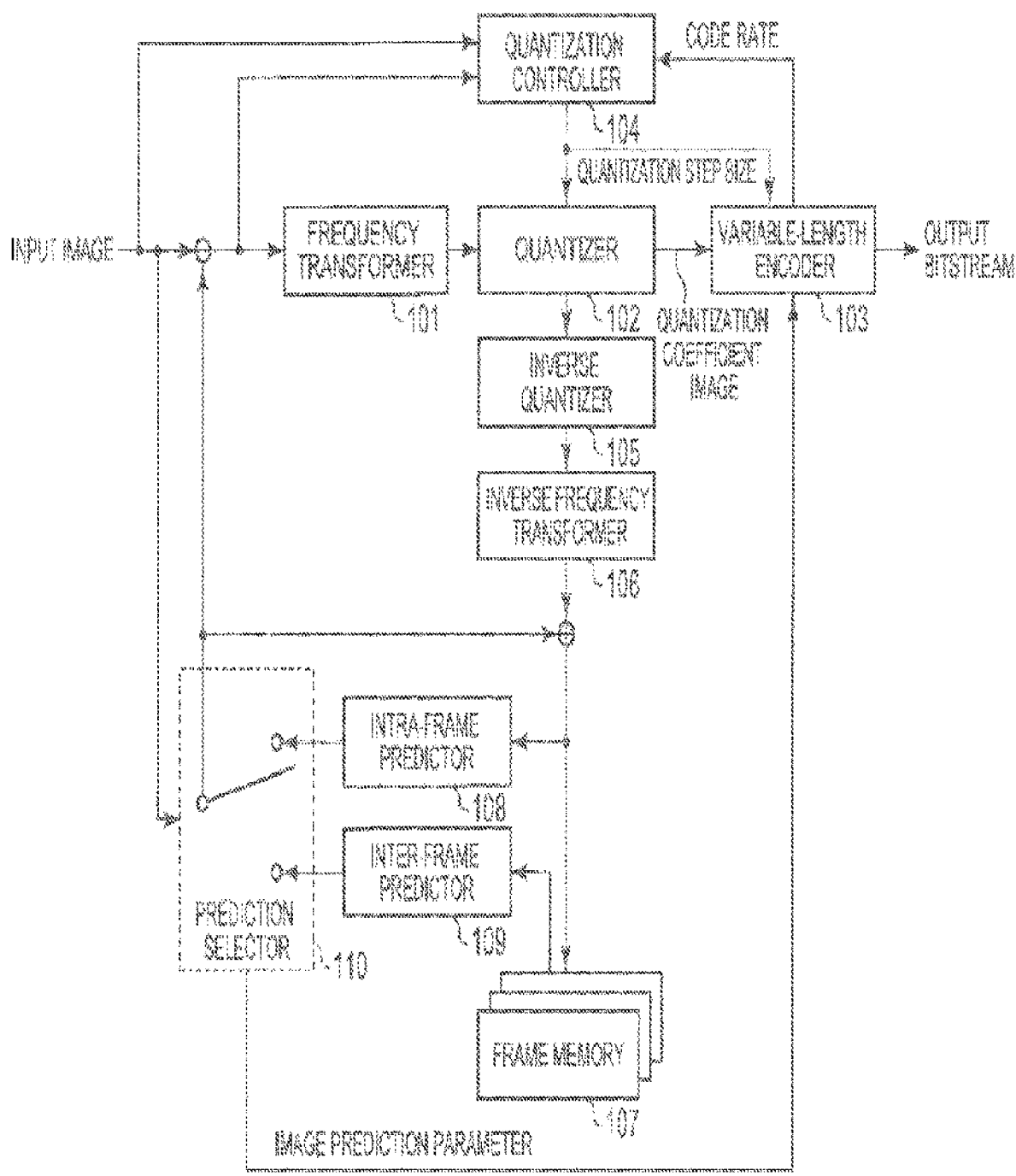
FIG. 24 It depicts a block diagram showing an example of the structure of a video encoding device.
Figure 25:
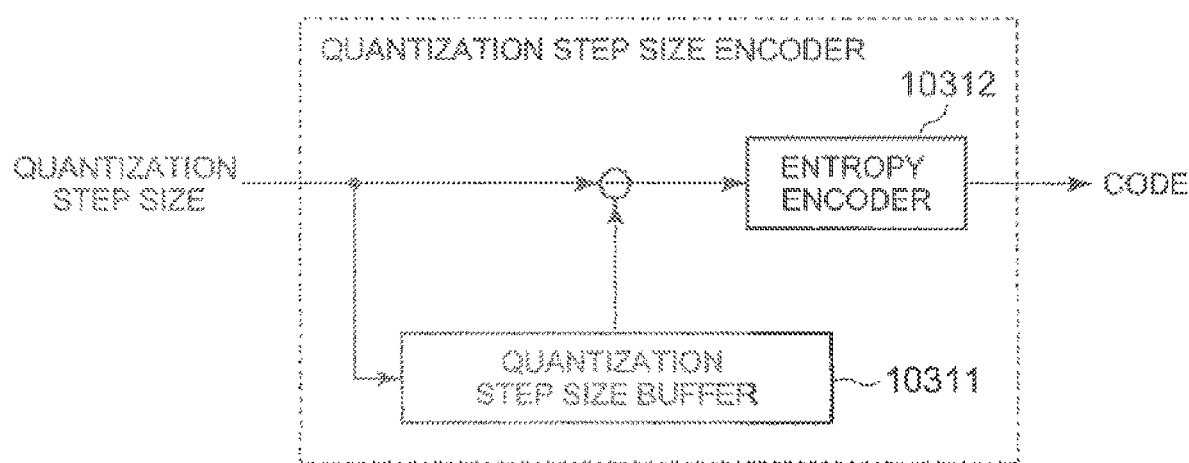
FIG. 25 It depicts a block diagram showing a quantization step size encoder in a typical video encoding device.

Like the video encoding device shown in FIG. 24, a video encoding device in a first exemplary embodiment of the present invention includes the frequency transformer 101, the quantizer 102, the variable-length encoder 103, the quantization controller 104, the inverse quantizer 105, the inverse frequency transformer 106, the frame memory 107, the intra-frame predictor 108, the inter-frame predictor 109, and the prediction selector 110. However, the structure of a quantization step size encoder included in the variable-length encoder 103 is different from the structure shown in FIG. 25.

Figure 1:
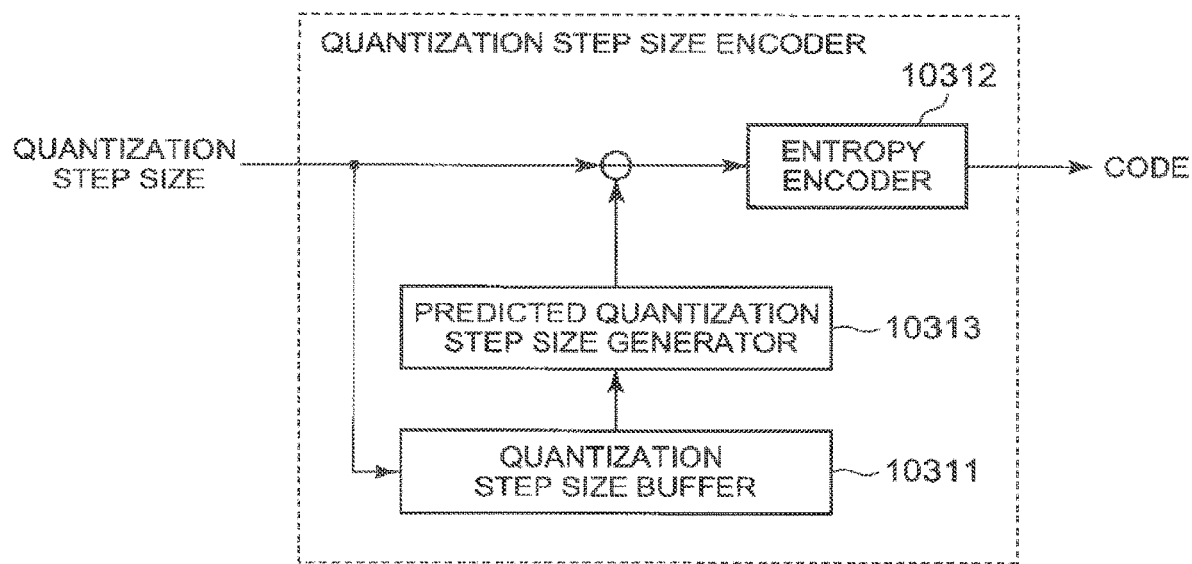
FIG. 1 It depicts a block diagram showing a quantization step size encoder in a video encoding device in a first exemplary embodiment of the present invention.

FIG. 1 is a block diagram showing a quantization step size encoder in the video encoding device in the first exemplary embodiment of the present invention. In comparison with the quantization step size encoder shown in FIG. 25, the quantization step size encoder in the exemplary embodiment is different in including a predicted quantization step size generator 10313 as shown in FIG. 1.

The quantization step size buffer 10311 stores and holds quantization step sizes assigned to image blocks encoded in the past.

The predicted quantization step size generator 10313 retrieves quantization step sizes assigned to neighboring image blocks encoded in the past from the quantization step size buffer to generate a predicted quantization step size.

The predicted quantization step size supplied from the predicted quantization step size generator 10313 is subtracted from the input quantization step size, and the result is input to the entropy encoder 10312 as a difference quantization step size.

The entropy encoder 10312 entropy-encodes the input difference quantization step size and outputs the result as code corresponding to the quantization step size.

Such a structure can reduce the code rate required to encode the quantization step size, and hence high-quality moving image encoding can be achieved. The reason is that the absolute amount for the difference quantization step size input to the entropy encoder 10312 can be reduced because the predicted quantization step size generator 10313 generates the predicted quantization step size using the quantization step sizes of neighboring image blocks independent of the encoding sequence. The reason why the absolute amount for the difference quantization step size input to the entropy encoder 10312 can be reduced if the predicted quantization step size is generated using the quantization step sizes of the neighboring image blocks is because there is generally correlation between neighboring pixels in a moving image and hence the degree of similarity of quantization step sizes assigned to neighboring image blocks having high correlation with each other is high when visual-sensitivity-based adaptive quantization is used.

A specific operation of the quantization step size encoder in the video encoding device in the first exemplary embodiment is described below by using a specific example.

In this example, it is assumed that the image block size as the unit of encoding is a fixed size. It is also assumed that three image blocks respectively adjacent leftwardly, upwardly, and diagonally right upward within the same image frame are used as neighboring image blocks used for prediction of the quantization step size.

Figure 2:
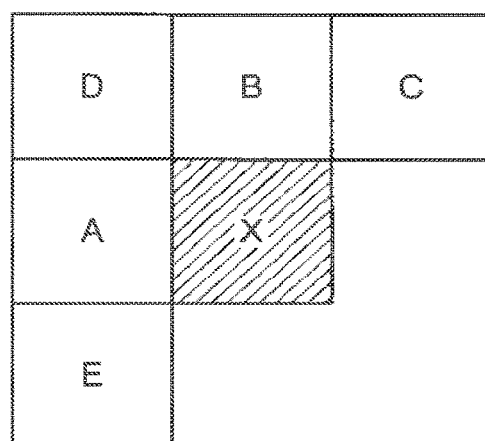
FIG. 2 It depicts an explanatory diagram showing an example of an image block to be encoded and neighboring image blocks.

Suppose that the current image block to be encoded is denoted by X, and three neighboring image blocks A, B, and C are located respectively adjacent leftwardly, upwardly, and diagonally right upward to the image block X as shown in FIG. 2. In this case, if the quantization step size in any block Z is denoted by Q(Z) and the predicted quantization step size is denoted by pQ(Z), the predicted quantization step size generator 10313 determines the predicted quantization step size pQ(X) by the following equation (3).

$$pQ(X)=\text{Median}(Q(A),Q(B),Q(C)) \quad (3)$$

Note that Median(x, y, z) is a function for determining an intermediate value from three values of x, y, z.

The entropy encoder 10312 encodes a difference quantization step size dQ(X) obtained by the following equation (4) using signed Exp-Golomb (Exponential-Golomb) code as one of entropy codes, and outputs the result as code corresponding to a quantization step size for the image block concerned.

$$dQ(X)=Q(X)-pQ(X) \quad (4)$$

In this example, the three image blocks adjacent leftwardly, upwardly, and diagonally right upward within the same image frame are used as the neighboring image blocks used for prediction of the quantization step size. However, the neighboring image blocks are not limited thereto. For example, image blocks adjacent leftwardly, upwardly, and diagonally left upward may be used to determine the predicted quantization step size by the following equation (5).

$$pQ(X)=\text{Median}(Q(A),Q(B),Q(D)) \quad (5)$$

The number of image blocks used for prediction may be any number rather than three, and a mean value or the like rather than the intermediate value may be used as the calculation used for prediction may use. The image blocks used for prediction are not necessarily to be adjacent to the image block to be encoded. The image blocks used for prediction may be separated by a predetermined distance from the image block to be encoded. Further, the image blocks used for prediction are not limited to image blocks located in the spatial neighborhood, i.e. within the same image frame, they may be image blocks within any other image frame already encoded.

Further, in this example, it is assumed that the image block to be encoded and the neighboring image blocks are of the same fixed size. However, the present invention is not limited to the case of the fixed size, and the block size as the unit of encoding may be a variable size.

Further, in this example, encoding is performed based on the Exp-Golomb code to encode the difference between the quantization step size of the image block to be encoded and the predicted quantization step size. However, the present invention is not limited to use of the Exp-Golomb code, and encoding may be performed based on any other entropy code. For example, encoding based on Huffman code or arithmetic code may be performed.

The above has described the video encoding device in the first exemplary embodiment of the present invention.

Exemplary Embodiment 2

Figure 26:
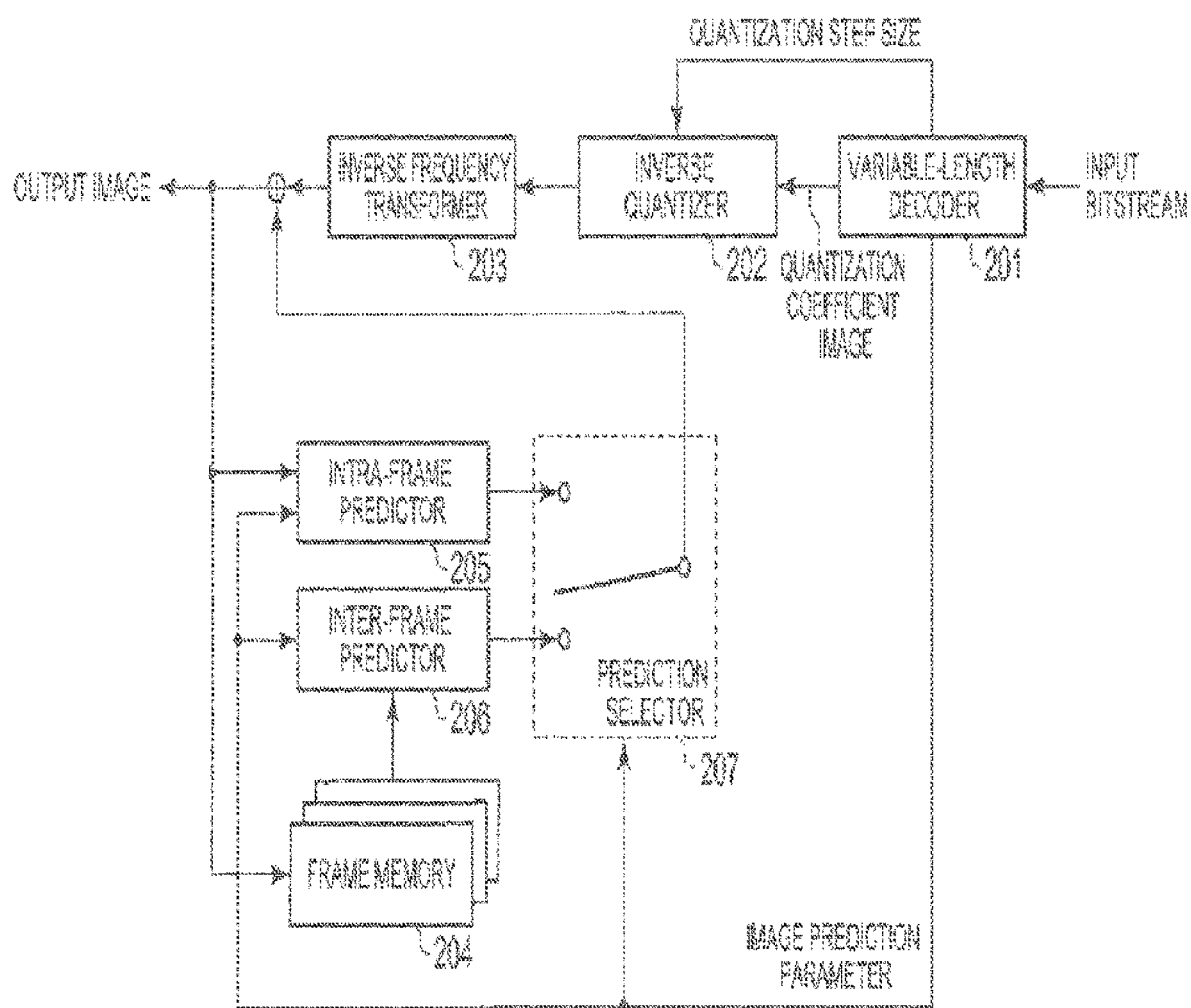
FIG. 26 It depicts a block diagram showing an example of the structure of a video decoding device.
Figure 27:
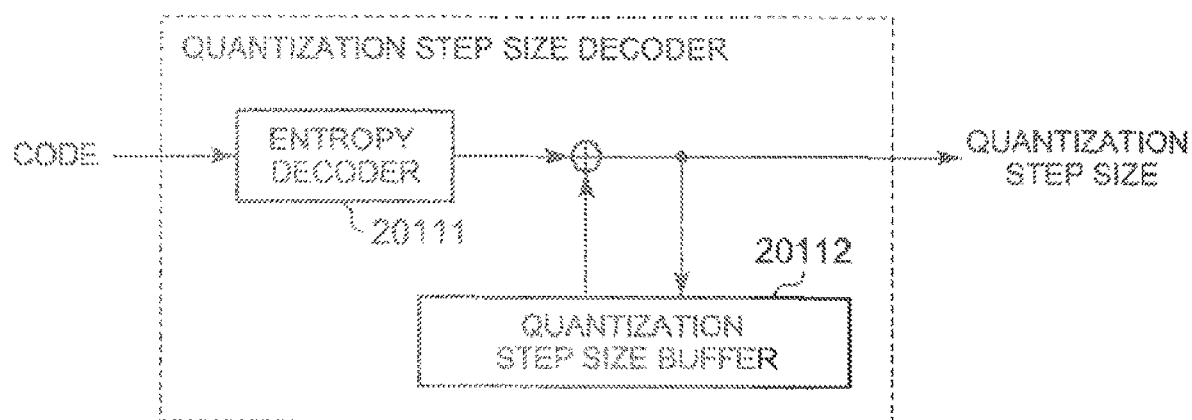
FIG. 27 It depicts a block diagram showing a quantization step size encoder in a typical video decoding device.

Like the video decoding device shown in FIG. 26, a video decoding device in a second exemplary embodiment of the present invention includes the variable-length decoder 201, the inverse quantizer 202, the inverse frequency transformer 203, the frame memory 204, the intra-frame predictor 205, the inter-frame predictor 206, and the prediction selector 207. However, the structure of a quantization step size decoder included in the variable-length decoder 201 is different from the structure shown in FIG. 27.

Figure 3:
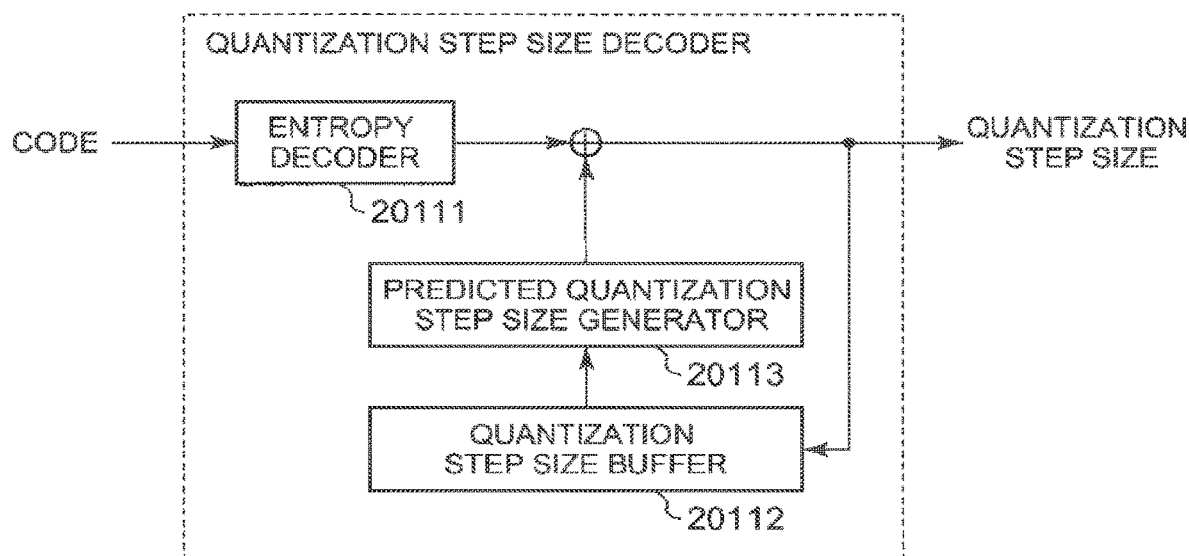
FIG. 3 It depicts a block diagram showing a quantization step size decoder in a video decoding device in a second exemplary embodiment of the present invention.

FIG. 3 is a block diagram showing a quantization step size decoder in the video decoding device in the second exemplary embodiment of the present invention. In comparison with the quantization step size decoder shown in FIG. 27, the quantization step size decoder in the exemplary embodiment is different in including a predicted quantization step size generator 20113 as shown in FIG. 3.

The entropy decoder 20111 entropy-decodes input code to output a difference quantization step size.

The quantization step size buffer 20112 stores and holds quantization step sizes decoded in the past.

Among quantization step sizes decoded in the past, the predicted quantization step size generator 20113 retrieves quantization step sizes corresponding to neighboring pixel blocks of the current image block to be decoded from the quantization step size buffer to generate a predicted quantization step size. Specifically, for example, the predicted quantization step size generator 20113 operates the same way as the predicted quantization step size generator 10313 in the specific example of the video encoding device in the first exemplary embodiment.

The predicted quantization step size supplied from the predicted quantization step size generator 20113 is added to a difference quantization step size generated by the entropy decoder 20111, and the result is not only output as the quantization step size, but also input to the quantization step size buffer 20112.

Such a structure of the quantization step size decoder enables the video decoding device to decode the quantization step size by receiving only a smaller code rate. As a result, a high-quality moving image can be decoded and regenerated. The reason is that the entropy decoder 20111 only has to decode the difference quantization step size near zero, because the predicted quantization step size comes close to the actually assigned quantization step size when the predicted quantization step size generator 20113 generates the predicted quantization step size using quantization step sizes of neighboring image blocks independent of the decoding sequence. The reason why the predicted quantization step size close to the actually assigned quantization step size can be obtained by generating the predicted quantization step size using the quantization step sizes of the neighboring image blocks is because there is generally correlation between neighboring pixels in a moving image and hence the degree of similarity of quantization step sizes assigned to neighboring image blocks having high correlation with each other is high when visual-sensitivity-based adaptive quantization is used.

The above has described the video decoding device in the second exemplary embodiment of the present invention.

Exemplary Embodiment 3

Like the video encoding device in the first exemplary embodiment of the present invention, a video encoding device in a third exemplary embodiment of the present invention includes the frequency transformer 101, the quantizer 102, the variable-length encoder 103, the quantization controller 104, the inverse quantizer 105, the inverse frequency transformer 106, the frame memory 107, the intra-frame predictor 108, the inter-frame predictor 109, and the prediction selector 110 as shown in FIG. 24. However, the structure of a quantization step size encoder included in the variable-length encoder 103 is different from the structure shown in FIG. 25.

Figure 4:
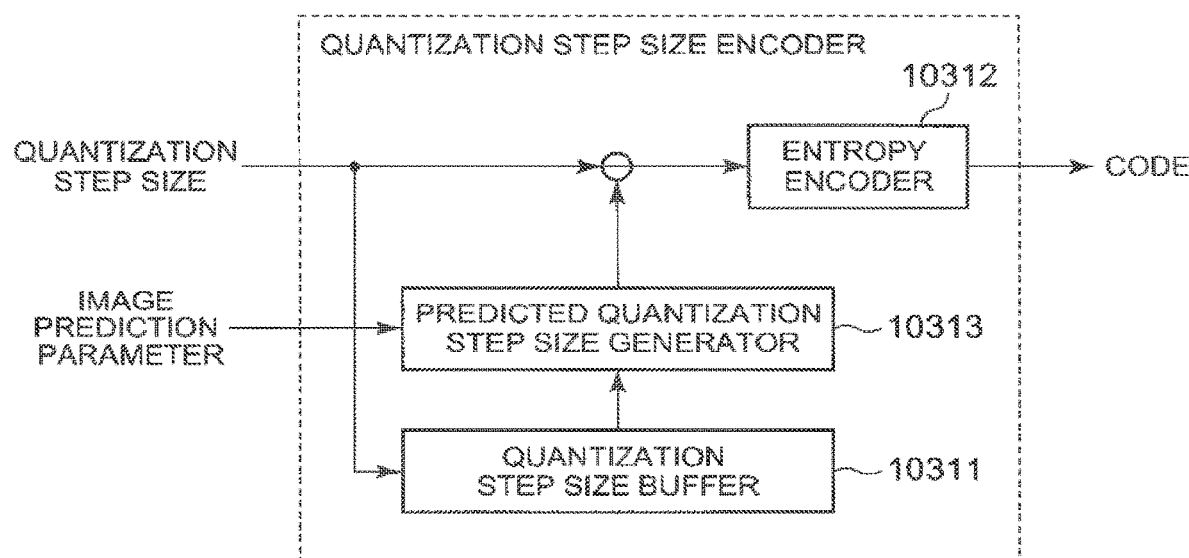
FIG. 4 It depicts a block diagram showing a quantization step size encoder in a video encoding device in a third exemplary embodiment of the present invention.

FIG. 4 is a block diagram showing a quantization step size encoder in the video encoding device in the third exemplary embodiment of the present invention. As shown in FIG. 4, the structure of the quantization step size encoder in the video encoding device in the third exemplary embodiment of the present invention is the same as the structure of the quantization step size encoder shown in FIG. 1. However, the third exemplary embodiment differs from the first exemplary embodiment in that the parameter used for image prediction is supplied from the prediction selector 110 shown in FIG. 24 to the predicted quantization step size generator 10313 in the third exemplary embodiment, and in the operation of the predicted quantization step size generator 10313.

Since the operation of the quantization step size buffer 10311 and the entropy encoder 10312 is the same as that of the quantization step size encoder in the video encoding device in the first exemplary embodiment, redundant description is omitted here.

The predicted quantization step size generator 10313 uses the image prediction parameter to select an image block to be used for prediction of the quantization step size from among image blocks encoded in the past. The predicted quantization step size generator 10313 generates a predicted quantization step size from a quantization step size corresponding to the image block selected.

Such a structure enables the video encoding device to further reduce the code rate required to encode the quantization step size compared with the video encoding device in the first exemplary embodiment. As a result, high-quality moving image encoding can be achieved. The reason is that the quantization step size can be predicted from neighboring image blocks having high correlation with the image block concerned because the predicted quantization step size generator 10313 predicts the quantization step size using the image prediction parameter.

Exemplary Embodiment 4

Like the video decoding device in the second exemplary embodiment of the present invention, a video decoding device in a fourth exemplary embodiment of the present invention includes the variable-length decoder 201, the inverse quantizer 202, the inverse frequency transformer 203, the frame memory 204, the intra-frame predictor 205, the inter-frame predictor 206, and the prediction selector 207 as shown in FIG. 26. However, the structure of a quantization step size decoder included in the variable-length decoder 201 is different from the structure shown in FIG. 27.

Figure 5:
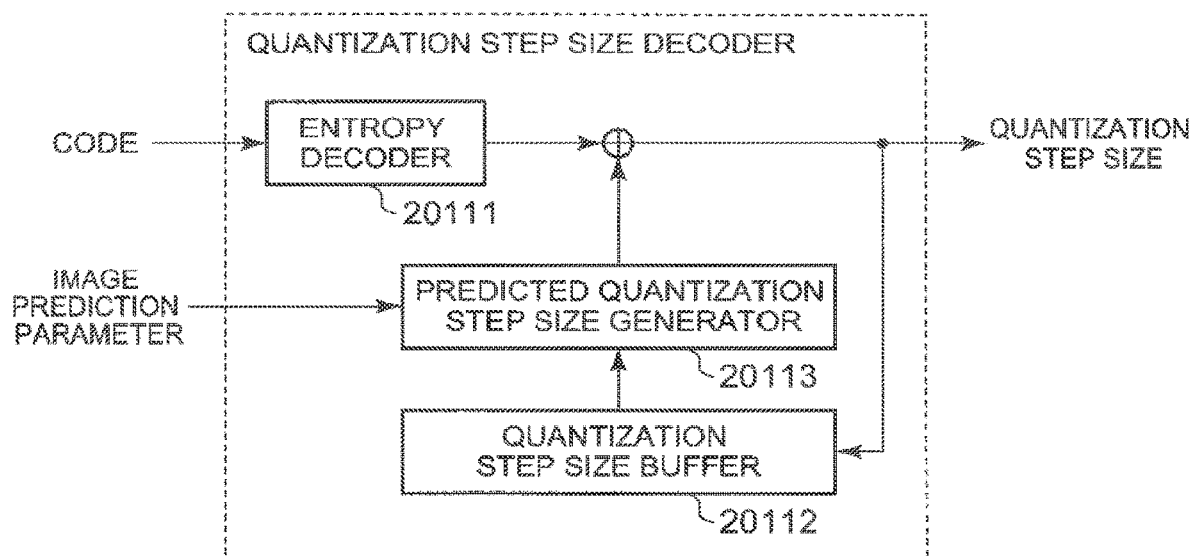
FIG. 5 It depicts a block diagram showing a quantization step size decoder in a video decoding device in a fourth exemplary embodiment of the present invention.

FIG. 5 is a block diagram showing a quantization step size decoder in the video decoding device in the fourth exemplary embodiment of the present invention. As shown in FIG. 5, the structure of the quantization step size decoder in the video decoding device in the fourth exemplary embodiment of the present invention is the same as the structure of the quantization step size decoder shown in FIG. 3. However, the fourth exemplary embodiment differs from the second exemplary embodiment in that the parameter used for image prediction is supplied from the prediction selector 207 shown in FIG. 26 to the predicted quantization step size generator 20313, and in the operation of the predicted quantization step size generator 20113.

Since the operation of the entropy decoder 20111 and the quantization step size buffer 20112 is the same as that of the quantization step size decoder in the video decoding device in the second exemplary embodiment, redundant description is omitted here.

The predicted quantization step size generator 20113 uses the image prediction parameter to select an image block to be used for prediction of the quantization step size from among the image blocks decoded in the past. The predicted quantization step size generator 20113 generates a predicted quantization step size from a quantization step size corresponding to the image block selected. A difference quantization step size output from the entropy decoder 20111 is added to the generated predicted quantization step size, and the result is not only output as the quantization step size, but also input to the quantization step size buffer 20112.

Since the derivation method for the predicted quantization step size at the predicted quantization step size generator 20113 is the same as the generation method for the predicted quantization step size at the predicted quantization step size generator 10313 in the video encoding device in the third exemplary embodiment mentioned above, redundant description is omitted here.

Such a structure enables the video decoding device to decode the quantization step size by receiving only a further smaller code rate compared with the video decoding device in the second exemplary embodiment. As a result, a high-quality moving image can be decoded and regenerated. The reason is that the quantization step size can be predicted from neighboring image blocks having higher correlation with the image block concerned because the predicted quantization step size generator 20113 predicts the quantization step size using the image prediction parameter.

Example 1

Using an example, a specific operation of the quantization step size encoder in the video encoding device in the third exemplary embodiment mentioned above is described below.

In the example, the prediction direction of intra-frame prediction is used as the image prediction parameter to be used for prediction of the quantization step size. Further, as the intra-frame prediction, directional prediction of eight directions and average prediction (illustrated in FIG. 6) used for 4×4 pixel blocks and 8×8 pixel blocks in AVC described in NPL 1 are used.

It is assumed that the image block size as the unit of encoding is a fixed size. It is also assumed that the block as the unit of determining the quantization step size (called quantization step size transmission block) and the block as the unit of intra-frame prediction (called a prediction block) are of the same size. If the current image block to be encoded is denoted by X, and four neighborhood blocks A, B, C, and D have a positional relationship shown in FIG. 2, the predicted quantization step size generator 10313 determines a predicted quantization step size pQ(X) by the following equation (6).

$pQ(X)=pQ(B)$; if $m=0$ $pQ(X)=pQ(A)$; if $m=1$ $pQ(X)=(pQ(A)+pQ(B)+1)/2$; if $m=2$ $pQ(X)=pQ(C)$; if $m=3$ $pQ(X)=pQ(D)$; if $m=4$ $pQ(X)=(pQ(C)+pQ(D)+1)/2$; if $m=5$ $pQ(X)=(pQ(A)+pQ(D)+1)/2$; if $m=6$ $pQ(X)=(pQ(B)+pQ(D)+1)/2$; if $m=7$ $pQ(X)=pQ(A)$; if $m=8$ (6)

Figure 6:
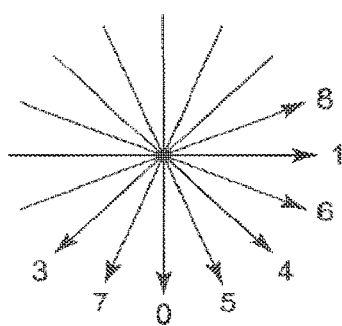
FIG. 6 It depicts an explanatory diagram showing prediction directions of intra-frame prediction.

Note that m is an intra-prediction direction index in a frame shown in FIG. 6.

The entropy encoder 10312 applies the quantization step size Q(X) and the predicted quantization step size pQ(X) to equation (4) to obtain a difference quantization step size dQ(X). The entropy encoder 10312 encodes the obtained difference quantization step size dQ(X) using the signed Exp-Golomb code as one of entropy codes, and outputs the result as code corresponding to a quantization step size for the image block concerned.

In the example, directional prediction of eight directions and average prediction are used as intra-frame prediction, but the present invention is not limited thereto. For example, directional prediction of 33 directions described in NPL 2 and average prediction may be used, or any other intra-frame prediction may be used.

Further, the number of image blocks used for prediction may be any number other than four. In the example, as shown in the equation (6) mentioned above, either a quantization step size in any one of image blocks or an average value of quantization step sizes in two image blocks is used as the predicted quantization step size. However, the present invention is not limited to equation (6) mentioned above, and any other calculation result may be used as the predicted quantization step size. For example, as shown in the following equation (7), either a quantization step size in any one of image blocks or an intermediate value of three quantization step sizes may be used, or the predicted quantization step size may be determined using any other calculation. Further, the image blocks used for prediction are not necessarily to be adjacent to the current image block to be encoded. The image blocks used for prediction may be separated by a predetermined distance from the current image block to be encoded.

$$pQ(X)=pQ(B); \text{ if } m=0,5 \text{ or } 7$$

$$pQ(X)=pQ(A); \text{ if } m=1,6 \text{ or } 8$$

$$pQ(X)=pQ(C); \text{ if } m=3$$

$$pQ(X)=pQ(D); \text{ if } m=4$$

$$pQ(X)=\text{Median}(pQ(A),pQ(B),pQ(C)); \text{ if } m=2 \qquad (7)$$

In the example, it is assumed that the image block to be encoded the neighboring image blocks are of the same fixed size. However, the present invention is not limited to the fixed size, and the block as the unit of encoding may be of a variable size.

Further, in the example, it is assumed that the quantization step size transmission blocks and the prediction block are of the same size. However, the present invention is not limited to the same size, and the quantization step size transmission blocks and the prediction block may be of different sizes. For example, if two or more prediction blocks are included in the quantization step size transmission blocks, a prediction block in any one of the two or more prediction blocks may be used for prediction of the quantization step size. Alternatively, the result of adding any calculation, such as an intermediate value calculation or an average value calculation, to the prediction directions of the two or more prediction blocks may be used for prediction of the quantization step size.

Further, in the example, the difference between the quantization step size of the image block to be encoded and the predicted quantization step size is encoded based on the Exp-Golomb code. However, the present invention is not limited to use of the Exp-Golomb code, and encoding based on any other entropy code may be performed. For example, encoding based on Huffman code or arithmetic code may be performed.

Example 2

Using another example, a specific operation of the quantization step size encoder in the video encoding device in the third exemplary embodiment mentioned above is described below.

Figure 7:
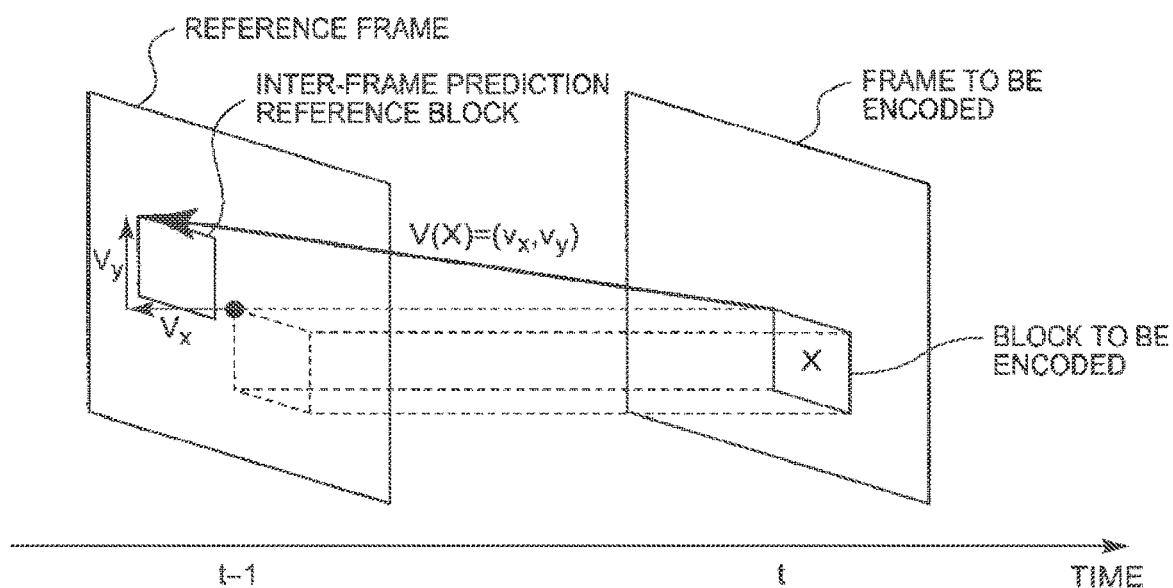
FIG. 7 It depicts an explanatory diagram showing an example of inter-frame prediction.

In this example, a motion vector of inter-frame prediction is used as the image prediction parameter used for prediction of the quantization step size. Prediction defined by the translation of block units as shown in FIG. 7 is assumed as inter-frame prediction. It is assumed that a prediction image is generated from an image block located in a position which is out of the same spatial position as the block to be encoded in the reference frame by a displacement corresponding to the motion vector. Also, as shown in FIG. 7, prediction from a single reference frame, i.e. one-directional prediction is assumed as inter-frame prediction. Further, in the example, it is assumed that the quantization step size transmission blocks and the prediction block are of the same size.

Here, the block to be encoded is denoted by X, the center position of block X is denoted by cent(X), the motion vector in inter-frame prediction of X is denoted by V(X), and the reference frame to be referred to in inter-frame prediction is denoted by RefPic(X). Then, as show in FIG. 8, a block to which the position cent(X)+V(X) belongs in the frame RefPic(X) is expressed as Block(RefPic(X),cent(X)+V(X)). The predicted quantization step size generator 10313 determines the predicted quantization step size pQ(X) by the following equation (8).

$$pQ(X)=Q(\text{Block}(\text{RefPic}(X),\text{cent}(X)+V(X))) \qquad (8)$$

The derivation of dQ(X) and the encoding process by the entropy encoder 10312 are the same as those in the first example.

In the example, one-directional prediction is assumed, but the present invention is not limited to use of one-directional prediction. For example, in the case of bi-directional prediction, where a prediction image is generated by weighted averaging reference image blocks in two reference frames, if one reference frame is denoted by RefPic0(X), a motion vector to RefPic0(X) is denoted by V0(X), the other reference frame is denoted by RefPic1(X), a motion vector to RefPic1(X) is denoted by V1(X), a weight given to RefPic0(X) upon generation of the prediction image is denoted by w0, and a weight given to RefPic1(X) is denoted by w1, the predicted quantization step size generator 10313 may determine the predicted quantization step size pQ(X) by the following equation (9).

$$pQ(X)=w0Q(\text{Block}(\text{RefPic0}(X),\text{cent}(X)+V0(X)))+w1Q \\ (\text{Block}(\text{RefPic1}(X),\text{cent}(X)+V1(X))) \qquad (9)$$

Further, in the example, the quantization step size of the block to which the center position of the reference image block belongs is used as the predicted quantization step size, but the predicted quantization step size is not limited thereto. For example, a quantization step size of a block to which an upper left position of the reference image block belongs may be used as the predicted quantization step size. Alternatively, quantization step sizes of blocks to which all pixels of the reference image block belong may be respectively referred to use an average value of these quantization step sizes as the predicted quantization step size.

Further, in the example, prediction represented by the translation between blocks is assumed as inter-frame prediction. However, the reference image block is not limited thereto, and it may be of any shape.

Further, in the example, it is assumed that the quantization step size transmission blocks and the prediction block are of the same size. However, like in the first example of the video encoding device in the third exemplary embodiment mentioned above, the quantization step size transmission blocks and the prediction block may be of sizes different from each other.

Example 3

Using still another example, a specific operation of the quantization step size encoder in the video encoding device in the third exemplary embodiment mentioned above is described below.

In the example, prediction of a motion vector of inter-frame prediction, i.e. a predicted motion vector is used as the image prediction parameter used for prediction of the quantization step size. When the predicted motion vector is derived from neighboring image blocks of the block to be encoded, quantization step sizes of the neighboring image blocks used for derivation of the predicted motion vector is used to predict a motion vector of the block to be encoded.

In the example, it is assumed that the quantization step size transmission blocks and the prediction block are of the same size. Also, like in the second example of the video encoding device in the third exemplary embodiment mentioned above, one-directional prediction represented by a motion vector is assumed as inter-frame prediction. In the example, a predicted motion vector derived by a predetermined method is subtracted from the motion vector shown in FIG. 7, and the difference is entropy-encoded. As the predetermined predicted motion vector derivation method, the predicted motion vector derivation method described in "8.4.2.1.4 Derivation process for luma motion vector prediction" of NPL 2 is used.

Here, the predicted motion vector derivation method used in the example is briefly described. The block to be encoded is denoted by X, and blocks adjacent leftwardly, upwardly, diagonally right upward, diagonally left upward, and diagonally left downward as shown in FIG. 2 are denoted by A, B, C, D, and E, respectively. A motion vector of block A is denoted by mvA and a motion vector of block B is denoted by mvB. When block C exists in the image and has already been encoded, a motion vector of block C is set as mvC. Otherwise, when block D exists in the image and has already been encoded, a motion vector of block D is set as mvC. Otherwise, a motion vector of block E is set as mvC.

Figure 8:
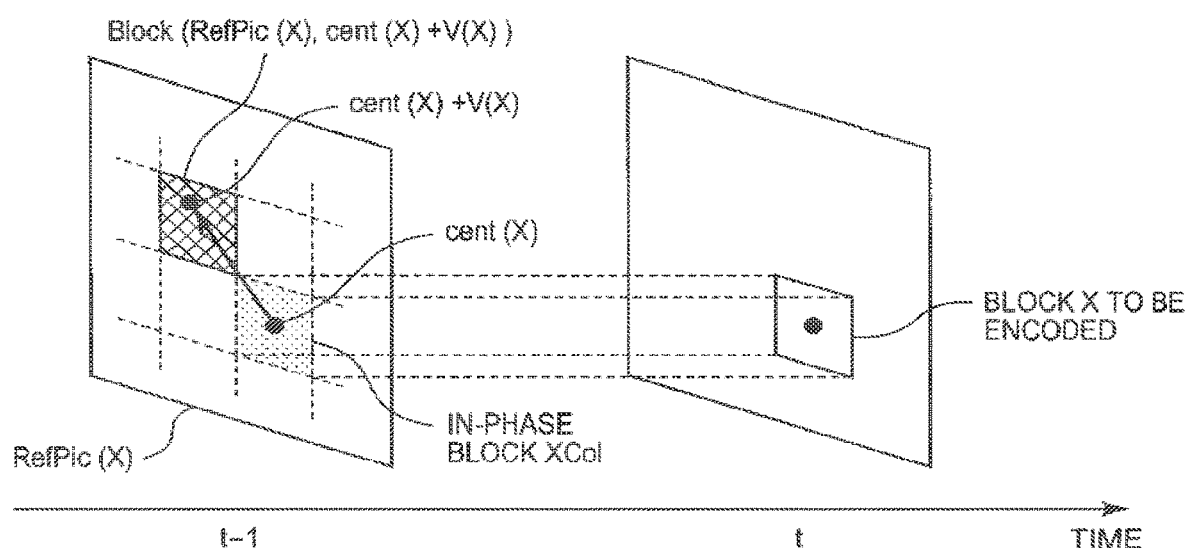
FIG. 8 It depicts an explanatory diagram showing an example of prediction of a quantization step size using a motion vector of inter-frame prediction in the video encoding device in the third exemplary embodiment of the present invention.

Further, a motion vector determined by the following equation (10) is denoted by mvMed, and a motion vector of a block in the same spatial position as the block to be encoded on a reference frame assigned to the image frame to be encoded (illustrated as an in-phase block XCol with respect to the block X to be encoded in FIG. 8) is denoted by mvCol. The assigned reference frame means, for example, an image frame encoded just before the image frame to be encoded.

$$mvMed=(mvMedx, mvMedy)$$

$$mvMedx=Median(mvAx, mvBx, mvCx)$$

$$mvMedy=Median(mvAy, mvBy, mvCy) \quad (10)$$

As described above, five motion vectors, i.e. mvMed, mvA, mvB, mvC, and mvCol are candidates for the predicted motion vector in the block X to be encoded. Any one motion vector is selected according to a predetermined priority order from among the candidates, and set as the predicted motion vector pMV(X) of the block to be encoded. An example of the predetermined priority order is described in "8.4.2.1.4 Derivation process for luma motion vector prediction" and "8.4.2.1.8 Removal process for motion vector prediction" of NPL 2.

When the predicted motion vector pMV(X) is determined as mentioned above, the predicted quantization step size generator 10313 determines a predicted quantization step size pQ(X) of the block X to be encoded by the following equation (11).

$$pQ(X)=Q(A); \text{ if } pMV(X)=mvA$$

$$pQ(X)=Q(B); \text{ otherwise if } pMV(X)=mvB$$

$$pQ(X)=Q(C); \text{ otherwise if } pMV(X)=mvC, \text{ and } mvC \text{ is motion vector of block } C$$

$$pQ(X)=Q(D); \text{ otherwise if } pMV(X)=mvC, \text{ and } mvC \text{ is motion vector of block } D$$

$$pQ(X)=Q(E); \text{ otherwise if } pMV(X)=mvC, \text{ and } mvC \text{ is motion vector of block } E$$

$$pQ(X)=Q(XCol); \text{ otherwise if } pMV(X)=mvCol$$

$$pQ(X)=Median(Q(A), Q(B), Q(C)); \text{ otherwise} \quad (11)$$

In the example, one-directional prediction is assumed, but the present invention is not limited to use of one-directional prediction. Like in the second example of the video encoding device in the third exemplary embodiment mentioned above, this example can also be applied to bi-directional prediction.

Further, in the example, the predicted motion vector derivation method described in "8.4.2.1.4 Derivation process for luma motion vector prediction" of NPL 2 is used as the predicted motion vector derivation method, but the present invention is not limited thereto. For example, as described in "8.4.2.1.3 Derivation process for luma motion vectors for merge mode" of NPL 2, if the motion vector of the block X to be encoded is predicted by a motion vector of either block A or block B, the predicted quantization step size generator 10313 may determine the predicted quantization step size pQ(X) of the block X to be encoded by the following equation (12), or any other predicted motion vector derivation method may be used.

$$pQ(X)=Q(A); \text{ if } pMV(X)=mvA$$

$$pQ(X)=Q(B); \text{ otherwise} \quad (12)$$

Further, in the example, the image blocks used for prediction of the quantization step size are referred to as shown in equation (11) in order of blocks A, B, C, D, E, and XCol. However, the present invention is not limited to this order, and any order may be used. As for the number and positions of image blocks used for prediction of the quantization step size, any number and positions of image blocks may be used. Further, in the example, an intermediate value calculation like in equation (3) is used when pMV(X) agrees with none of mvA, mvB, mvC, and mvCol, but the present invention is not limited to use of the intermediate value calculation. Any calculation such as the average value calculation like in the first exemplary embodiment may also be used.

Further, in the example, it is assumed that the quantization step size transmission blocks and the prediction block are of the same size. However, the quantization step size transmission blocks and the prediction block may be of sizes different from each other like in the first example and second example of the video encoding device in the third exemplary embodiment mentioned above.

Exemplary Embodiment 5

Figure 9:
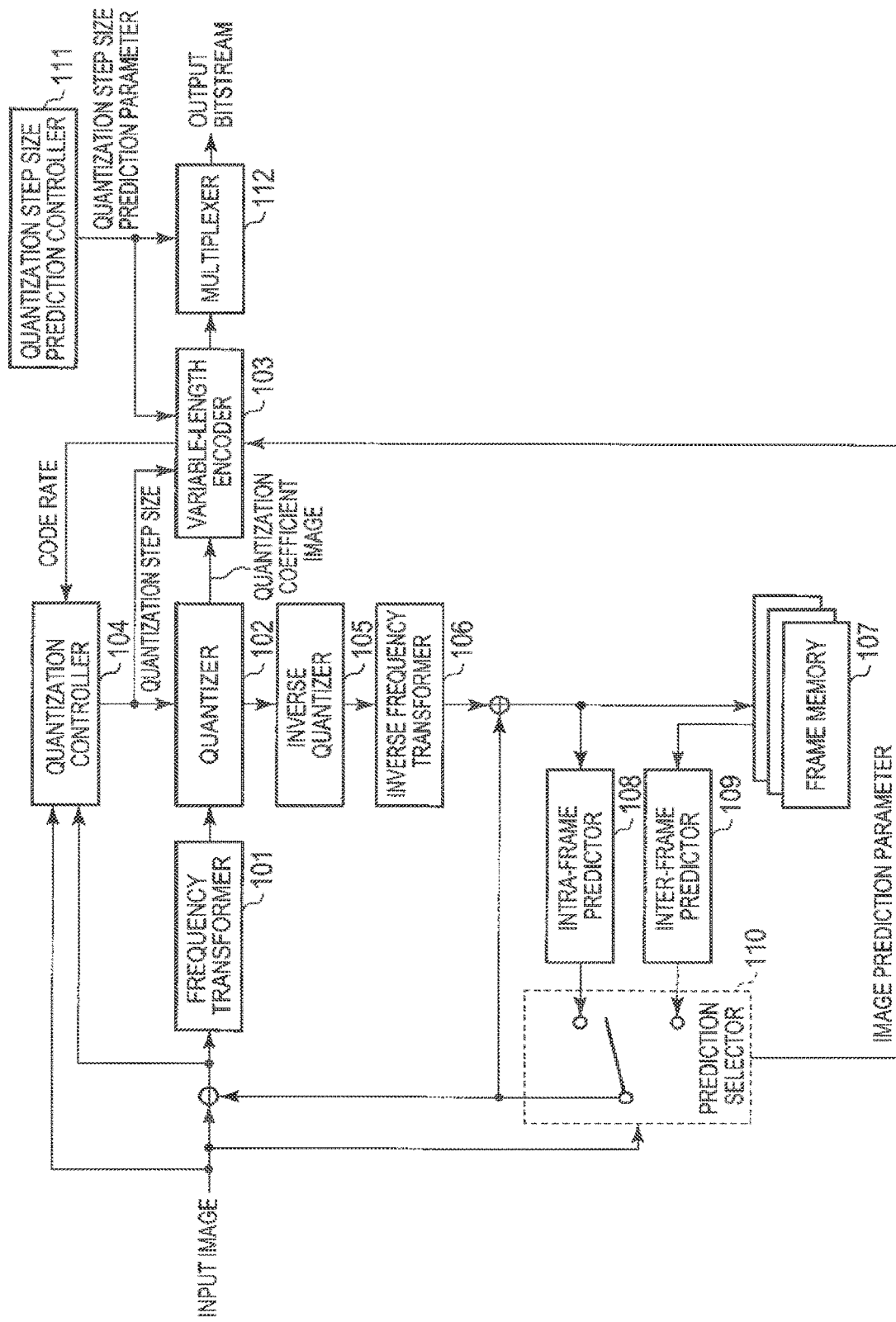
FIG. 9 It depicts a block diagram showing the structure of another video encoding device according to the present invention.
Figures 10, 11:
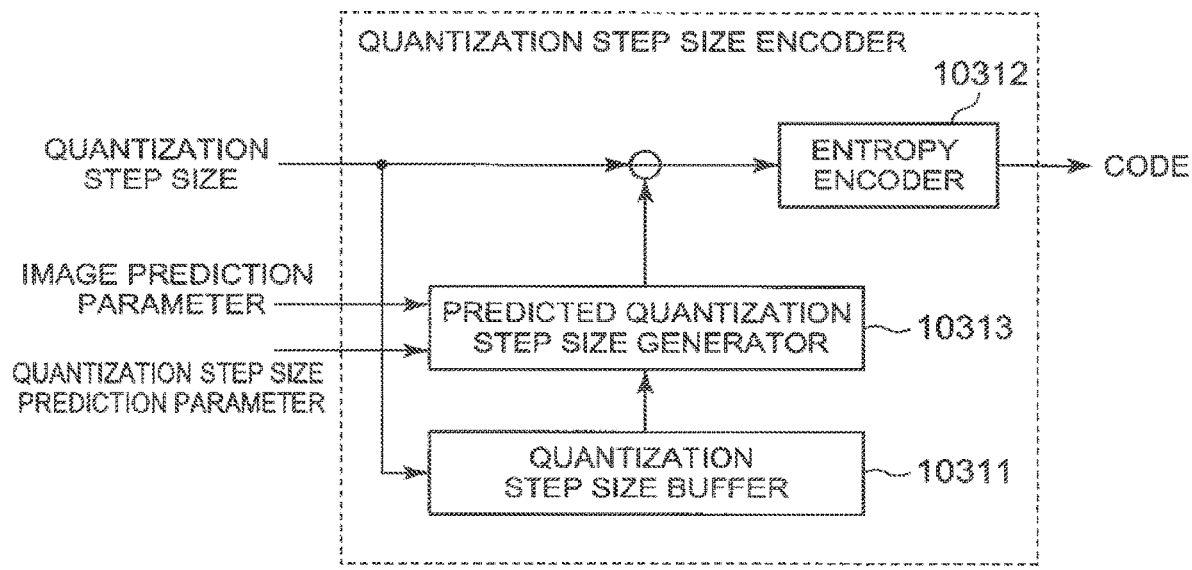
FIG. 10 It depicts a block diagram showing a characteristic component in another video encoding device according to the present invention.
FIG. 11 It depicts an explanatory diagram of a list showing an example of multiplexing of quantization step size prediction parameters.

FIG. 9 is a block diagram showing the structure of a video encoding device in a fifth exemplary embodiment of the present invention. FIG. 10 is a block diagram showing the structure of a quantization step size encoder in the video encoding device in this exemplary embodiment.

In comparison with the video encoding device shown in FIG. 24, the video encoding device in this exemplary embodiment is different in that a quantization step size prediction controller 111 and a multiplexer 112 are included as shown in FIG. 9. Note that the video encoding device shown in FIG. 24 is also the video encoding device in the third exemplary embodiment as described above.

Further, as shown in FIG. 10, this exemplary embodiment differs from third exemplary embodiment in that a quantization step size encoder for encoding the quantization step size in the variable-length encoder 103 of the video encoding device is configured to supply the quantization step size prediction parameter from the quantization step size prediction controller 111 shown in FIG. 9 to the predicted quantization step size generator 10313 in comparison with the quantization step size encoder shown in FIG. 4, and in the operation of the predicted quantization step size generator 10313.

The quantization step size prediction controller 111 supplies control information for controlling the quantization step size prediction operation of the predicted quantization step size generator 10313 to the variable-length encoder 103 and the multiplexer 112. The control information for controlling the quantization step size prediction operation is called a quantization step size prediction parameter.

The multiplexer 112 multiplexes the quantization step size prediction parameter into a video bitstream supplied from the variable-length encoder 103, and outputs the result as a bitstream.

Using the image prediction parameter and the quantization step size prediction parameter, the predicted quantization step size generator 10313 selects an image block used for prediction of the quantization step size from among image blocks encoded in the past. The predicted quantization step size 10313 also generates a predicted quantization step size from a quantization step size corresponding to the image block selected.

Such a structure of the video encoding device in the exemplary embodiment can further reduce the code rate required to encode the quantization step size in comparison with the video encoding device in the third exemplary embodiment. As a result, high-quality moving image encoding can be achieved. The reason is that the quantization step size can be predicted for the image block with a higher accuracy, because the predicted quantization step size generator 10313 uses the quantization step size prediction parameter in addition to the image prediction parameter to switch or correct a prediction value of the quantization step size using the image prediction parameter. The reason why the quantization step size can be predicted with a higher accuracy by switching or correction using the quantization step size prediction parameter is because the quantization controller 104 shown in FIG. 9 monitors the output code rate of the variable-length encoder 103 to increase or decrease the quantization step size without depending on the human visual sensitivity alone, and hence a quantization step size to be given also to image blocks having the same visual sensitivity can vary.

A specific operation of the quantization step size encoder in the video encoding device in the fifth exemplary embodiment mentioned above is described using a specific example below.

In this example, like in the second example of the video encoding device in the third exemplary embodiment mentioned above, a motion vector of inter-frame prediction is used as the image prediction parameter used for prediction of the quantization step size. Prediction defined by the translation of block units as shown in FIG. 7 is assumed as inter-frame prediction. In this case, it is assumed that a prediction image is generated from an image block located in a position which is out of the same spatial position as the block to be encoded in the reference frame by a displacement corresponding to the motion vector. Also, as shown in FIG. 7, prediction from a single reference frame, i.e. one-directional prediction is assumed as inter-frame prediction. Further, in the example, it is assumed that the quantization step size transmission blocks and the prediction block are of the same size.

Here, the block to be encoded is denoted by X, the frame to be encoded is denoted by Pic(X), the center position of block X is denoted by cent(X), the motion vector in inter-frame prediction of X is denoted by V(X), and the reference frame to be referred to in inter-frame prediction is denoted by RefPic(X). Then, as show in FIG. 8, a block to which the position cent(X)+V(X) belongs in the frame RefPic(X) is expressed as Block(RefPic(X),cent(X)+V(X)). Further, it is assumed that three neighboring image blocks A, B, and C are located in positions respectively adjacent leftwardly, upwardly, and diagonally right upward to block X as shown in FIG. 2. In this case, the predicted quantization step size generator 10313 determines the predicted quantization step size pQ(X) by the following equation (13).

$$pQ(X)=Q(Block(RefPic(X),cent(X)+V(X)); \text{ if temporal\_qp\_pred\_flag}=1$$

$$pQ(X)=Median(pQ(A),pQ(B),Q(C)); \text{ otherwise} \quad (13)$$

Here, temporal_qp_pred_flag represents a flag for switching between whether or not the motion vector between frames can be used for prediction of the quantization step size. The flag is supplied from the quantization step size prediction controller 111 to the predicted quantization step size generator 10313.

The predicted quantization step size generator 10313 may also use an offset value for compensating for a change in quantization step size between the frame Pic(X) to be encoded and the reference frame RefPic(X), i.e. an offset to the quantization step size Qofs(Pic(X), RefPic(X)) to determine the predicted quantization step size pQ(X) by the following equation (14).

$$pQ(X)=Q(Block(RefPic(X),cent(X)+V(X))+Qofs(Pic(X),RefPic(X)) \quad (14)$$

Further, the predicted quantization step size generator 10313 may use both temporal_qp_pred_flag mentioned above and the offset to the quantization step size to determine the predicted quantization step size pQ(X) by the following equation (15).

$$pQ(X)=Q(Block(RefPic(X),cent(X)+V(X))+Qofs(Pic(X),RefPic(X)); \text{ if temporal\_qp\_pred\_flag}=1$$

$$pQ(X)=Median(pQ(A),pQ(B),Q(C)); \text{ otherwise} \quad (15)$$

For example, if the initial quantization step size of any frame Z is denoted by Qinit(Z), the offset to the quantization step size Qofs(Pic(X), RefPic(X)) in equations (14) and (15) mentioned above may be determined by the following equation (16).

$$Qofs(Pic(X), RefPic(X)) = Qinit(Pic(X)) - Qinit(RefPic(X)) \qquad (16)$$

The initial quantization step size is a value given as the initial value of the quantization step size for each frame, and SliceQP$_Y$ described in "7.4.3 Slice header semantics" of NPL 1 may be used, for example.

For example, as illustrated in a list shown in FIG. 11, which corresponds to the description in "Specification of syntax functions, categories, and descriptors" of NPL 1, either or both of the temporal_qp_pred_flag value and the Qofs(Pic(X), RefPic(X)) value mentioned above may be multiplexed into a bitstream as part of header information.

In the list shown in FIG. 11, qp_pred_offset represents the Qofs value in equation (14) mentioned above. As shown in FIG. 11, multiple pieces of qp_pred_offset may be multiplexed as Qofs values corresponding to respective reference frames, or one piece of qp_pred_offset may be multiplexed as a common Qofs value to all the reference frames.

In the example, the motion vector of inter-frame prediction is assumed as the image prediction parameter. However, the present invention is not limited to use of the motion vector of inter-frame prediction. Like in the first example of the video encoding device in the third exemplary embodiment mentioned above, the prediction direction of intra-frame prediction may be so used that the flag mentioned above will switch between whether to use the prediction direction of intra-frame prediction or not for prediction of the quantization step size. Like in the third example of the video encoding device in the third exemplary embodiment mentioned above, the prediction direction of the predicted motion vector may be used, or any other image prediction parameter may be used.

Further, in the example, one-directional prediction is assumed as inter-frame prediction. However, the present invention is not limited to use of one-directional prediction. Like in the second example of the video encoding device in the third exemplary embodiment mentioned above, the present invention can also be applied to bi-directional prediction.

Further, in the example, the quantization step size of a block to which the center position of the reference image block belongs is used as the predicted quantization step size. However, the derivation of the predicted quantization step size in the present invention is not limited thereto. For example, the quantization step size of a block to which the upper left position of the reference image block belongs may be used as the predicted quantization step size. Alternatively, quantization step sizes of blocks to which all pixels of the reference image block belong may be respectively referred to use an average value of these quantization step sizes as the predicted quantization step size.

Further, in the example, prediction represented by the translation between blocks of the same shape is assumed as inter-frame prediction. However, the reference image block in the present invention is not limited thereto, and it may be of any shape.

Further, in the example, as shown in equation (13) and equation (15), when inter-frame prediction information is not used, the quantization step size is predicted from three spatially neighboring image blocks based on the intermediate value calculation, but the present invention is not limited thereto. Like in the specific example of the first exemplary embodiment, the number of image blocks used for prediction may be any number other than three, and an average value calculation or the like may be used instead of the intermediate value calculation. Further, the image blocks used for prediction are not necessarily to be adjacent to the current image block to be encoded, and the image blocks may be separated by a predetermined distance from the current image block to be encoded.

Further, in the example, it is assumed that the quantization step size transmission blocks and the prediction block are of the same size, but like in the first example of the video encoding device in the third exemplary embodiment mentioned above, the quantization step size transmission blocks and the prediction block may be of sizes different from each other.

Exemplary Embodiment 6

Figure 12:
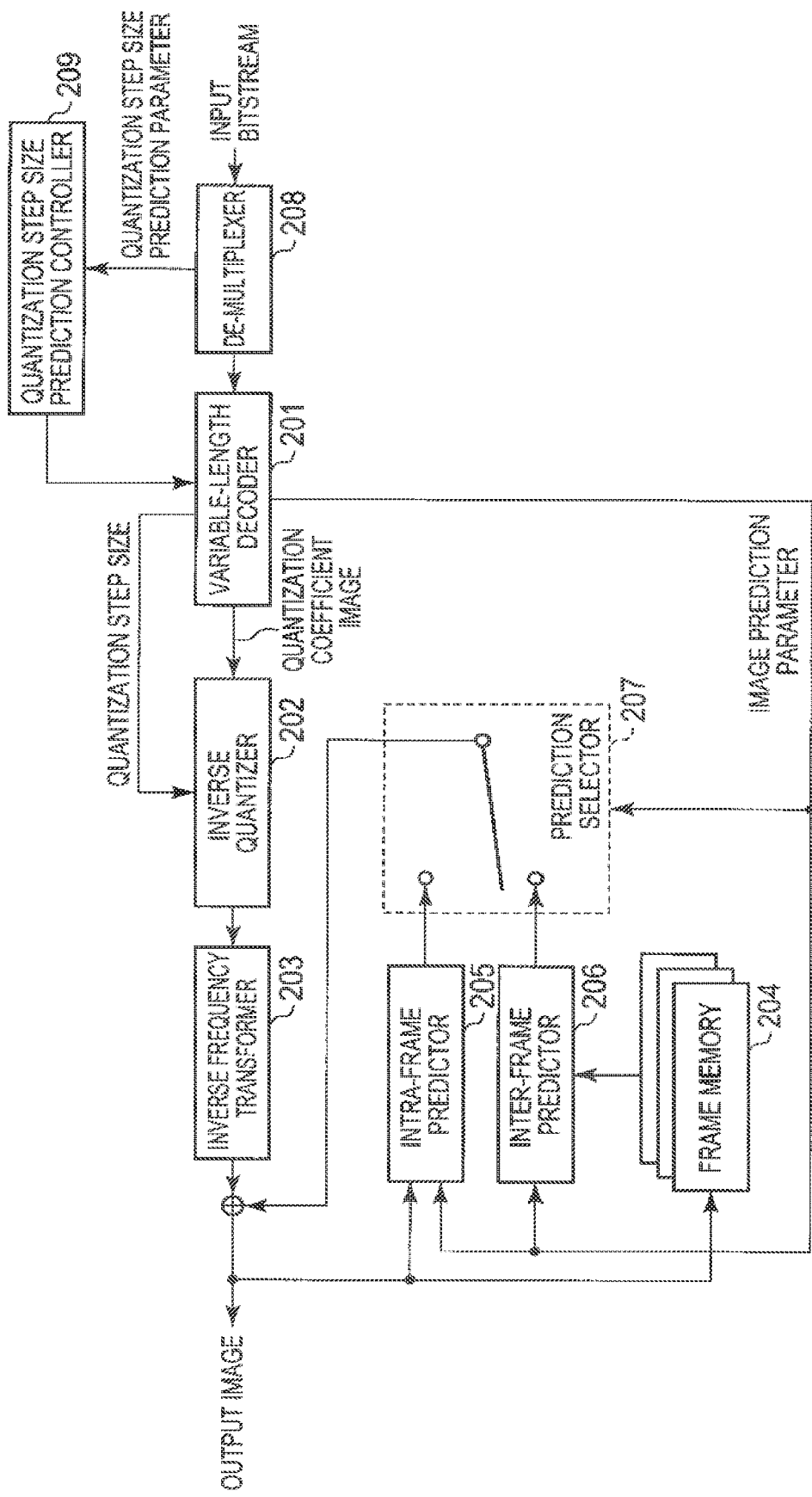
FIG. 12 It depicts a block diagram showing the structure of another decoding device according to the present invention.
Figure 13:
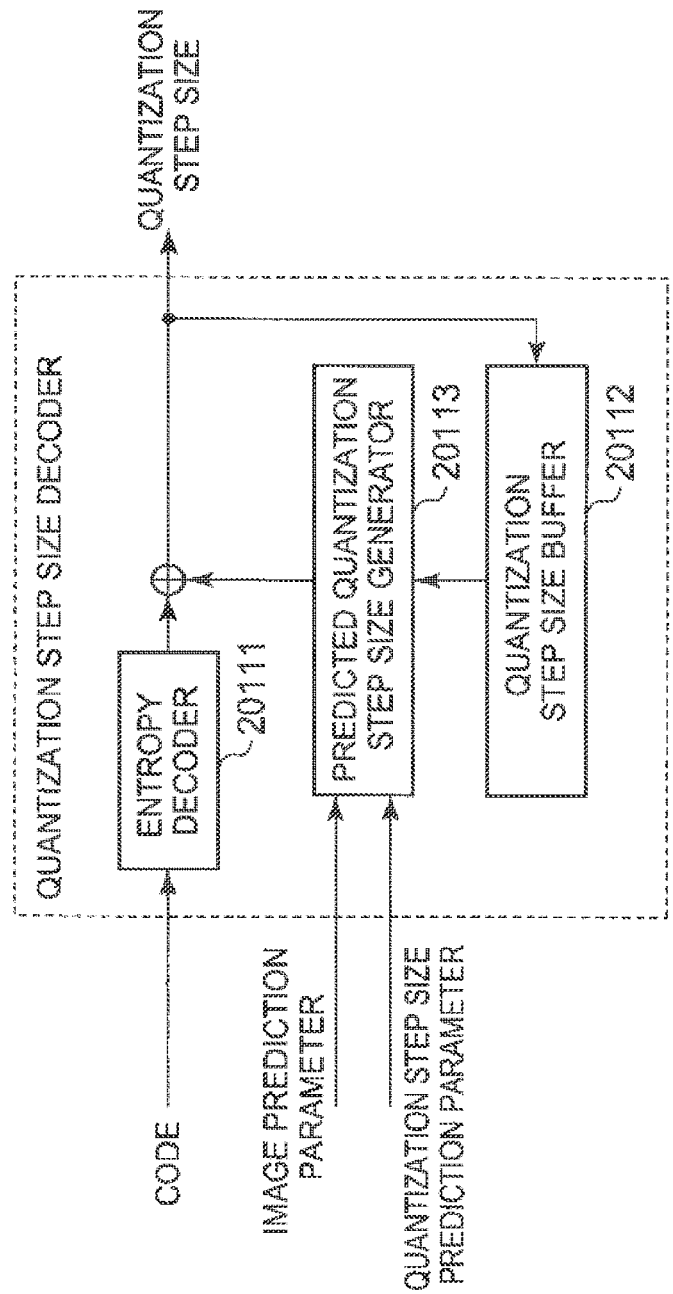
FIG. 13 It depicts a block diagram showing a characteristic component in another video decoding device according to the present invention.

FIG. 12 is a block diagram showing the structure of a video decoding device in a sixth exemplary embodiment of the present invention. FIG. 13 is a block diagram showing the structure of a quantization step size decoder in the video decoding device in the exemplary embodiment.

In comparison with the video decoding device shown in FIG. 26, the video decoding device in the exemplary embodiment differs in including a de-multiplexer 208 and a quantization step size prediction controller 209 as shown in FIG. 12. As described above, the video decoding device shown in FIG. 26 is also the video decoding device in the fourth exemplary embodiment.

Further, in comparison with the quantization step size decoder shown in FIG. 5, a quantization step size decoder for decoding the quantization step size in the variable-length decoder 201 of the video decoding device in the exemplary embodiment differs as shown in FIG. 13 from the fourth exemplary embodiment in that the quantization step size prediction parameter is supplied from the quantization step size prediction controller 209 shown in FIG. 12 to the predicted quantization step size generator 20113, an in the operation of the predicted quantization step size generator 20113.

The de-multiplexer 208 de-multiplexes a bitstream to extract a video bitstream and control information for controlling the quantization step size prediction operation. The de-multiplexer 208 further supplies the extracted control information to the quantization step size prediction controller 209, and the extracted video bitstream to the variable-length decoder 201, respectively.

The quantization step size prediction controller 209 sets up the operation of the predicted quantization step size generator 20113 based on the control information supplied.

The predicted quantization step size generator 20113 uses the image prediction parameter and the quantization step size prediction parameter to select an image block used for prediction of the quantization step size from among the image blocks decoded in the past. The predicted quantization step size generator 20113 further generates a predicted quantization step size from a quantization step size corresponding to the selected image block. A difference quantization step size output from the entropy decoder 20111 is added to the generated predicted quantization step size, and the result is not only output as the quantization step size, but also input to the quantization step size buffer 20112.

Since the derivation method for the predicted quantization step size at the predicted quantization step size generator 20113 is the same as the generation method for the predicted quantization step size at the predicted quantization step size generator 10313 in the video encoding device in the fifth exemplary embodiment mentioned above, redundant description is omitted here.

Such a structure enables the video decoding device to decode the quantization step size by receiving only a further smaller code rate compared with the video decoding device in the fourth exemplary embodiment. As a result, a high-quality moving image can be decoded and regenerated. The reason is that the quantization step size can be predicted for the image block with a higher accuracy because the predicted quantization step size generator 20113 uses the quantization step size prediction parameter in addition to the image prediction parameter to switch or correct a predicted value of the quantization step size using the image prediction parameter.

Exemplary Embodiment 7

Like the video encoding device in the third exemplary embodiment, a video encoding device in a seventh exemplary embodiment of the present invention includes the frequency transformer 101, the quantizer 102, the variable-length encoder 103, the quantization controller 104, the inverse quantizer 105, the inverse frequency transformer 106, the frame memory 107, the intra-frame predictor 108, the inter-frame predictor 109, and the prediction selector 110 as shown in FIG. 24. However, the structure of a quantization step size encoder included in the variable-length encoder 103 is different from the structure of the video encoding device in the third exemplary embodiment shown in FIG. 4.

Figure 14:
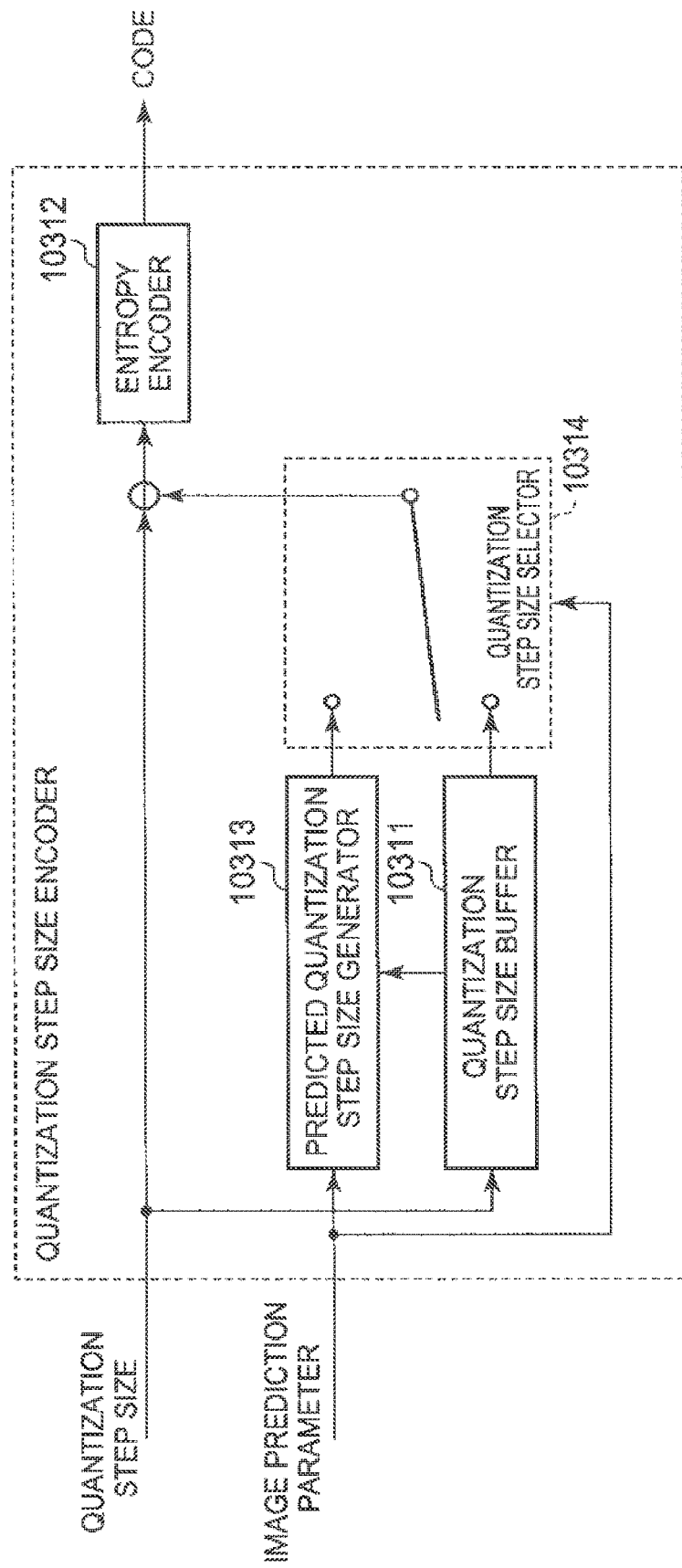
FIG. 14 It depicts a block diagram showing a quantization step size encoder in a seventh exemplary embodiment of the present invention.

FIG. 14 is a block diagram showing the structure of the quantization step size encoder in the video encoding device in the seventh exemplary embodiment of the present invention. In comparison with the quantization step size encoder shown in FIG. 4, the structure of the quantization step size encoder in the exemplary embodiment is different in including a quantization step size selector 10314 as shown in FIG. 14.

Since the operation of the quantization step size buffer 10311, the entropy encoder 10312, and the predicted quantization step size generator 10313 is the same as the operation of the quantization step size encoder in the video encoding device in the third exemplary embodiment, redundant description is omitted here.

The quantization step size selector 10314 selects either a quantization step size assigned to the previously encoded image block or a predicted quantization step size output from the predicted quantization step size generator 10313 according to the image prediction parameter, and outputs the result as a selectively predicted quantization step size. The quantization step size assigned to the previously encoded image block is saved in the quantization step size buffer 10311. The selectively predicted quantization step size output from the quantization step size selector 10314 is subtracted from the quantization step size input to the quantization step size encoder and to be currently encoded, and the result is input to the entropy encoder 10312.

Such a structure enables the video encoding device in the exemplary embodiment to further reduce the code rate required to encode the quantization step size compared with the video encoding device in the third exemplary embodiment. As a result, high-quality moving image encoding can be achieved. The reason is that the quantization step size can be encoded by the operation of the quantization step size selector 10314 to selectively use the predicted quantization step size derived from the image prediction parameter and the previously encoded quantization step size. The reason why the code rate required to encode the quantization step size can be further reduced by selectively using the predicted quantization step size derived from the image prediction parameter and the previously encoded quantization step size is because the quantization controller 104 in the encoding device not only performs visual-sensitivity-based adaptive quantization but also monitors the output code rate to increase or decrease the quantization step size as described above.

A specific operation of the quantization step size encoder in the video encoding device in the seventh exemplary embodiment is described using a specific example below.

Here, the prediction direction of intra-frame prediction is used as the image prediction parameter used for prediction of the quantization step size. Further, as the intra-frame prediction, directional prediction of eight directions and average prediction (see FIG. 6) used for 4×4 pixel blocks and 8×8 pixel blocks in the AVC scheme described in NPL 1 are used.

It is assumed that the image block size as the unit of encoding is a fixed size. It is also assumed that the block as the unit of determining the quantization step size (called quantization step size transmission block) and the block as the unit of intra-frame prediction (called a prediction block) are of the same size. If the current image block to be encoded is denoted by X, and four neighborhood blocks A, B, C, and D have a positional relationship shown in FIG. 2, the predicted quantization step size generator 10313 determines the predicted quantization step size pQ(X) by equation (6) mentioned above.

The quantization step size selector 10314 selects either the predicted quantization step size pQ(X) obtained by equation (6) or the previously encoded quantization step size Q(Xprev) according to the following equation (17) to generate a selectively predicted quantization step size sQ(X), i.e. the predicted quantization step size determined by equation (6) is used as the selectively predicted quantization step size for directional prediction and the previous quantization step size is used as the selectively predicted quantization step size for average value prediction.

$$sQ(X)=Q(Xprev); \text{ if } m=2$$

$$sQ(X)=pQ(X); \text{ if } m=0,1,3,4,5,6,7 \text{ or } 8 \quad (17)$$

Note that m is an intra-frame prediction direction index in the frame shown in FIG. 6.

The entropy encoder 10312 encodes a difference quantization step size dQ(X) obtained by the following equation (18) using the signed Exp-Golomb (Exponential-Golomb) code as one of entropy codes, and outputs the result as code corresponding to a quantization step size for the image block concerned.

$$dQ(X)=Q(X)-sQ(X) \quad (18)$$

In the exemplary embodiment, direction prediction of eight directions and average prediction are used as intra-frame prediction, but the present invention is not limited thereto. For example, directional prediction of 33 directions described in NPL 2 and average prediction may be used, or any other intra-frame prediction may be used.

Further, in the exemplary embodiment, the selection between the predicted quantization step size and the previously encoded quantization step size is made based on the parameters of intra-frame prediction, but the present invention is not limited to use of intra-frame prediction information. For example, selections may be made to use the predicted quantization step size in the intra-frame prediction block and the previously encoded quantization step size in the inter-frame prediction block, or vice versa. When the parameters of inter-frame prediction meet a certain specific condition, a selection may be made to use the previously encoded quantization step size.

The number of image blocks used for prediction may be any number other than four. Further, in the exemplary embodiment, either a quantization step size in any one of image blocks or an average value of quantization step sizes in two image blocks is used as the predicted quantization step size as shown in equation (6). However, the predicted quantization step size is not limited to those in equation (6). Any other calculation result may be used as the predicted quantization step size. For example, as shown in equation (7), either a quantization step size in any one of image blocks or an intermediate value of three quantization step sizes may be used, or the predicted quantization step size may be determined using any other calculation. Further, the image blocks used for prediction are not necessarily to be adjacent to the current image block to be encoded. The image blocks used for prediction may be separated by a predetermined distance from the current image block to be encoded.

Further, in the exemplary embodiment, it is assumed that the image block to be encoded and the image blocks used for prediction are of the same fixed size. However, the present invention is not limited to the case where the image block as the unit of encoding is of a fixed size. The image block as the unit of encoding may be of a variable size, and the image block to be encoded and the image blocks used for prediction may be of sizes different from each other.

Further, in the exemplary embodiment, it is assumed that the quantization step size transmission blocks and the prediction block are of the same size. However, the present invention is not limited to the case of the same size, and the quantization step size transmission blocks and the prediction block may be of different sizes. For example, when two or more prediction blocks are included in the quantization step size transmission blocks, the prediction direction of any one prediction block of the two or more prediction blocks may be used for prediction of the quantization step size. Alternatively, the result of adding any calculation, such as the intermediate value calculation or the average value calculation, to the prediction directions of the two or more prediction blocks may be used for prediction of the quantization step size.

Further, in the exemplary embodiment, the difference between the quantization step size of the image block to be encoded and the predicted quantization step size is encoded based on the Exp-Golomb code. However, the present invention is not limited to use of the Exp-Golomb code, and encoding based on any other entropy code may be performed. For example, encoding based on Huffman code or arithmetic code may be performed.

Exemplary Embodiment 8

Like the video decoding device in the fourth exemplary embodiment of the present invention, a video decoding device in an eighth exemplary embodiment of the present invention includes the variable-length decoder 201, the inverse quantizer 202, the inverse frequency transformer 203, the frame memory 204, the intra-frame predictor 205, the inter-frame predictor 206, and the prediction selector 207 as shown in FIG. 26. However, the structure of a quantization step size decoder included in the variable-length decoder 201 is different from the structure shown in FIG. 5.

Figure 15:
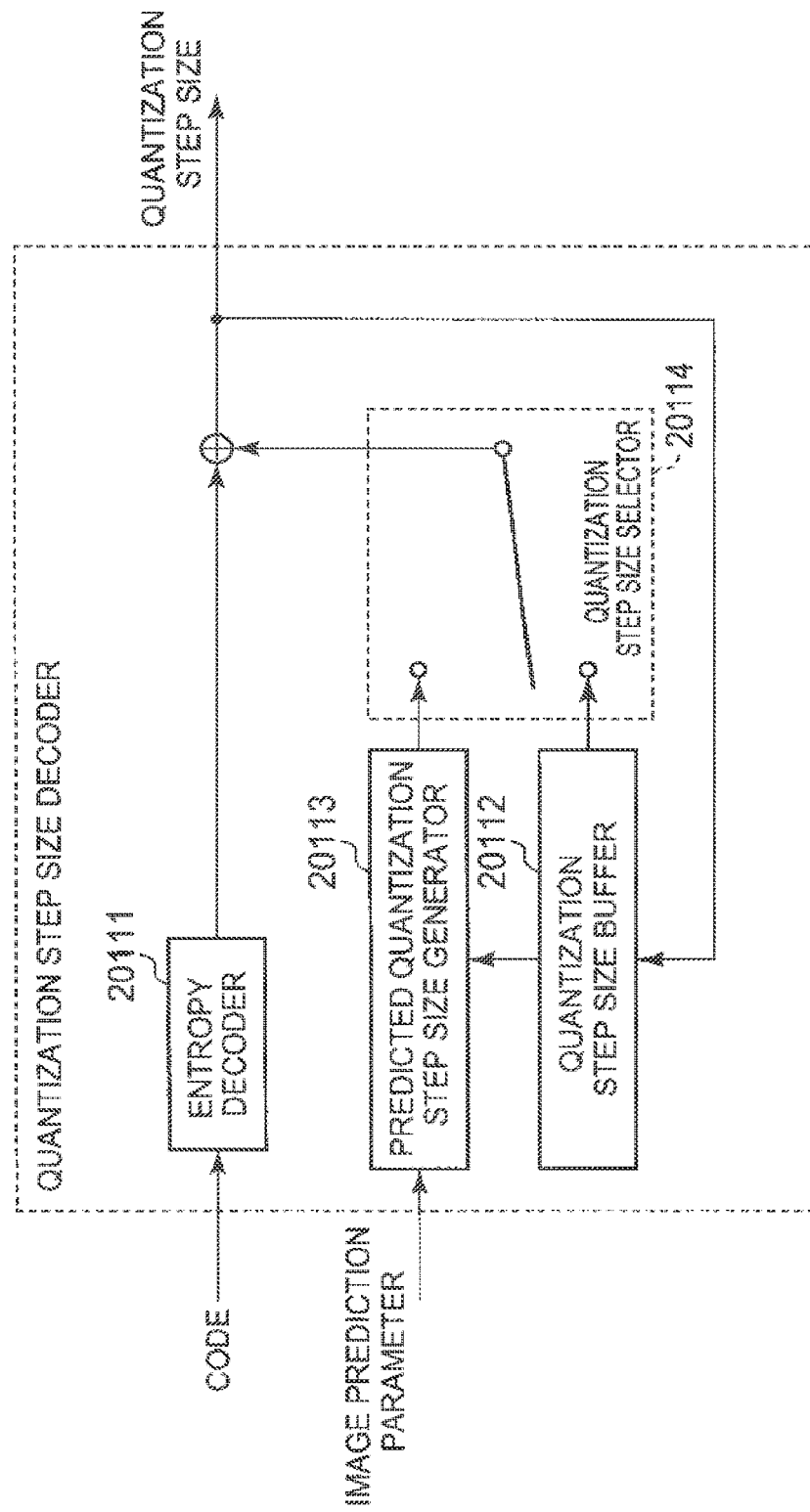
FIG. 15 It depicts a block diagram showing a quantization step size decoder in a video decoding device in an eighth exemplary embodiment of the present invention.

FIG. 15 is a block diagram showing a quantization step size decoder in the video decoding device in the eighth exemplary embodiment of the present invention. In comparison with the structure of the quantization step size decoder shown in FIG. 5, the structure of the quantization step size decoder in the exemplary embodiment is different in including a quantization step size selector 20114 as shown in FIG. 15.

Since the operation of the entropy decoder 20111, the quantization step size buffer 20112, and the predicted quantization step size generator 20113 is the same as the operation of the quantization step size decoder in the video encoding device in the fourth exemplary embodiment, redundant description is omitted here.

The quantization step size selector 20114 selects either a quantization step size assigned to the previously decoded image block or a predicted quantization step size output from the predicted quantization step size generator 20113 according to the image prediction parameter, and outputs the result as a selectively predicted quantization step size. The quantization step size assigned to the previously decoded image block is saved in the quantization step size buffer 20112. A difference quantization step size generated by the entropy decoder 20111 is added to the selectively predicted quantization step size output, and the result is not only output as the quantization step size, but also stored in the quantization step size buffer 20112.

Such a structure enables the video decoding device to decode the quantization step size by receiving only a further smaller code rate compared with the video decoding device in the fourth exemplary embodiment. As a result, a high-quality moving image can be decoded and regenerated. The reason is that the quantization step size can be decoded by the operation of the quantization step size selector 20114 to selectively use the predicted quantization step size derived from the image prediction parameter and the previously encoded quantization step size so that the quantization step size can be decoded with a smaller code rate for a bitstream generated by applying both the visual-sensitivity-based adaptive quantization and the increase or decrease in quantization step size resulting from monitoring the output code rate, and hence a moving image can be decoded and regenerated by the smaller code rate.

Each of the exemplary embodiments mentioned above may be realized by hardware, or a computer program.

Figure 16:
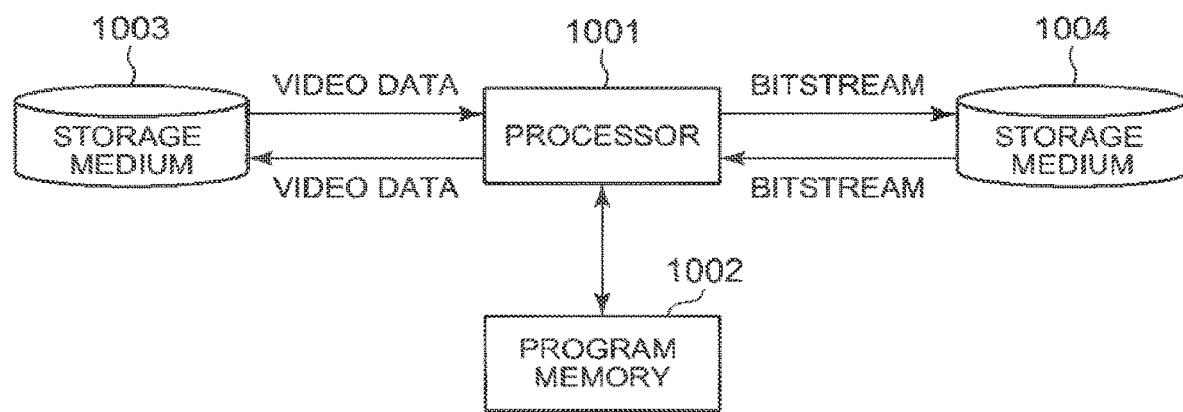
FIG. 16 It depicts a block diagram showing a configuration example of an information processing system capable of implementing the functions of a video encoding device and a video decoding device according to the present invention.

An information processing system shown in FIG. 16 includes a processor 1001, a program memory 1002, a storage medium 1003 for storing vide data, and a storage medium 1004 for storing a bitstream. The storage medium 1003 and the storage medium 1004 may be separate storage media, or storage areas included in the same storage medium. As the storage medium, a magnetic storage medium such as a hard disk can be used as the storage medium.

In the information processing system shown in FIG. 16, a program for implementing the function of each block (including each of the blocks shown in FIG. 1, FIG. 3, FIG. 4, and FIG. 5, except the buffer block) shown in each of FIG. 24 and FIG. 26 is stored in the program memory 1002. The processor 1001 performs processing according to the program stored in the program memory 1002 to implement the functions of the video encoding device or the video decoding device shown in each of FIG. 24, FIG. 26, and FIG. 1, FIG. 3, FIG. 4, and FIG. 5, respectively.

Figure 17:
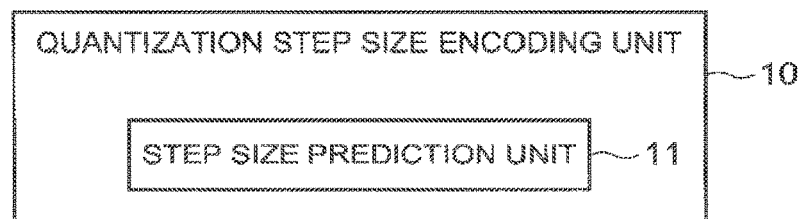
FIG. 17 It depicts a block diagram showing characteristic components in a video encoding device according to the present invention.

FIG. 17 is a block diagram showing characteristic components in a video encoding device according to the present invention. As shown in FIG. 17, the video encoding device according to the present invention includes a quantization step size encoding unit 10 for encoding a quantization step size that controls the granularity of quantization, and the quantization step size encoding unit 10 includes a quantization step size prediction unit 11 for predicting the quantization step size using quantization step sizes assigned to neighboring image blocks already encoded.

Figure 18:
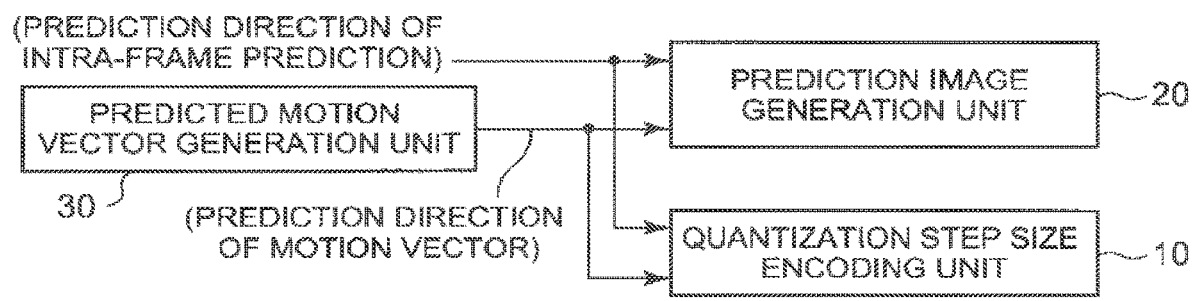
FIG. 18 It depicts a block diagram showing characteristic components in another video encoding device according to the present invention.

FIG. 18 is a block diagram showing characteristic components in another video encoding device according to the present invention. As shown in FIG. 18, the other video encoding device according to the present invention includes, in addition to the structure shown in FIG. 17, a prediction image generation unit 20 for using images encoded in the past and a predetermined parameter to generate a prediction image of an image block to be encoded. In this structure, the quantization step size encoding unit 10 predicts the quantization step size using parameters used in generating the prediction image. A predicted motion vector generation unit 30 for predicting a motion vector used for inter-frame prediction by using motion vectors assigned to neighboring image blocks already encoded may also be included so that the quantization step size encoding unit 10 will use a prediction direction of the predicted motion vector to predict the quantization step size.

Figure 19:
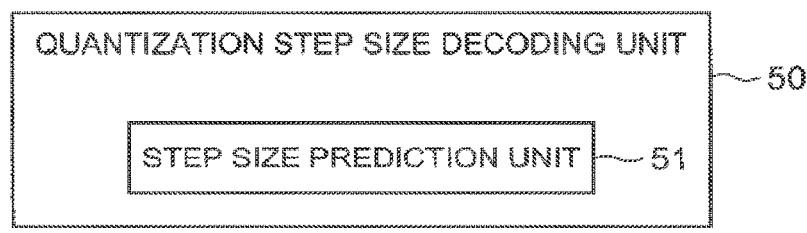
FIG. 19 It depicts a block diagram showing characteristic components in a video decoding device according to the present invention.

FIG. 19 is a block diagram showing characteristic components in a video decoding device according to the present invention. As shown in FIG. 19, the video decoding device according to the present invention includes a quantization step size decoding unit 50 for decoding a quantization step size that controls the granularity of inverse quantization, and the quantization step size decoding unit 50 includes a step size prediction unit 51 for predicting the quantization step size using quantization step sizes assigned to neighboring image blocks already decoded.

Figure 20:
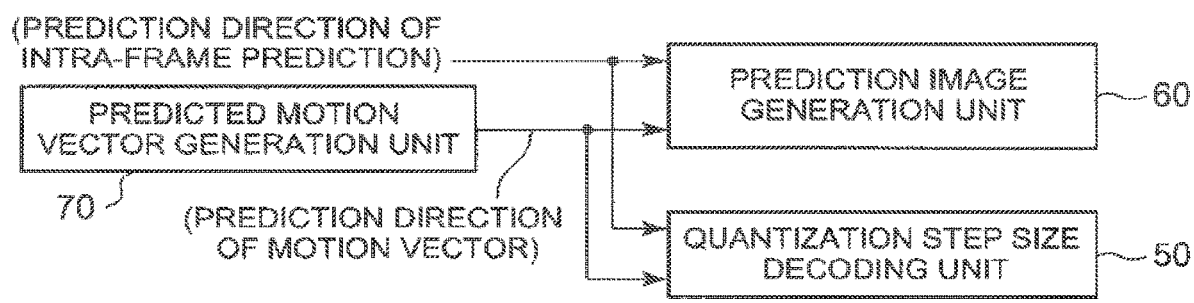
FIG. 20 It depicts a block diagram showing characteristic components in another video decoding device according to the present invention.

FIG. 20 is a block diagram showing characteristic components in another video decoding device according to the present invention. As shown in FIG. 20, the other video decoding device according to the present invention includes, in addition to the structure shown in FIG. 19, a prediction image generation unit 60 for using images decoded in the past and predetermined parameters to generate a prediction image of an image block to be decoded. In this structure, the quantization step size decoding unit 50 predicts a quantization step size using parameters used in generating the prediction image. A predicted motion vector generation unit 70 for predicting a motion vector used for inter-frame prediction by using a motion vector assigned to a neighboring image block already encoded may also be so included that the quantization step size decoding unit 50 will use a prediction direction of the predicted motion vector to predict the quantization step size.

Figure 21:
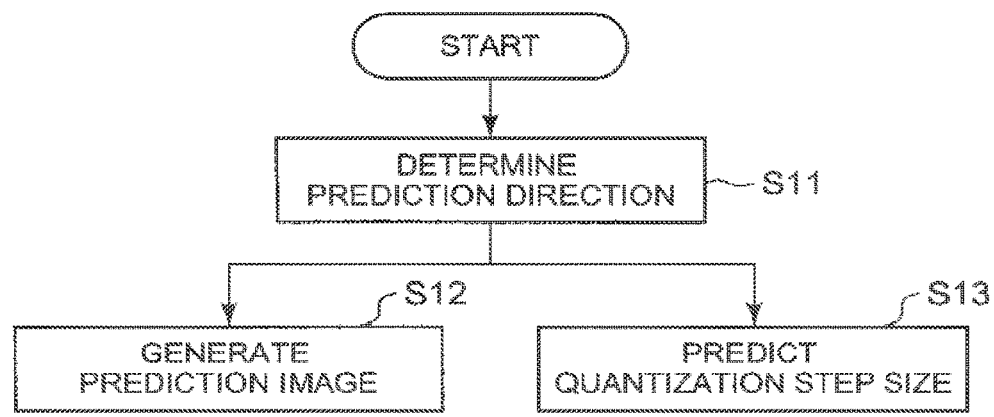
FIG. 21 It depicts a flowchart showing characteristic steps in a video encoding method according to the present invention.

FIG. 21 is a flowchart showing characteristic steps in a video encoding method according to the present invention. As shown in FIG. 21, the video encoding method includes step S11 for determining a prediction direction of intra-frame prediction, step S12 for generating a prediction image using intra-frame prediction, and step S13 for predicting a quantization step size using the prediction direction of intra-frame prediction.

Figure 22:
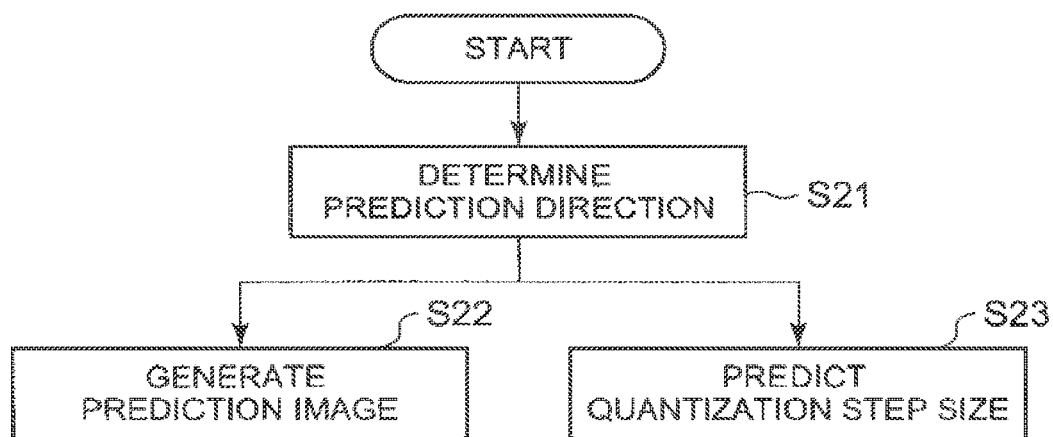
FIG. 22 It depicts a flowchart showing characteristic steps in a video decoding method according to the present invention.
Figure 23:
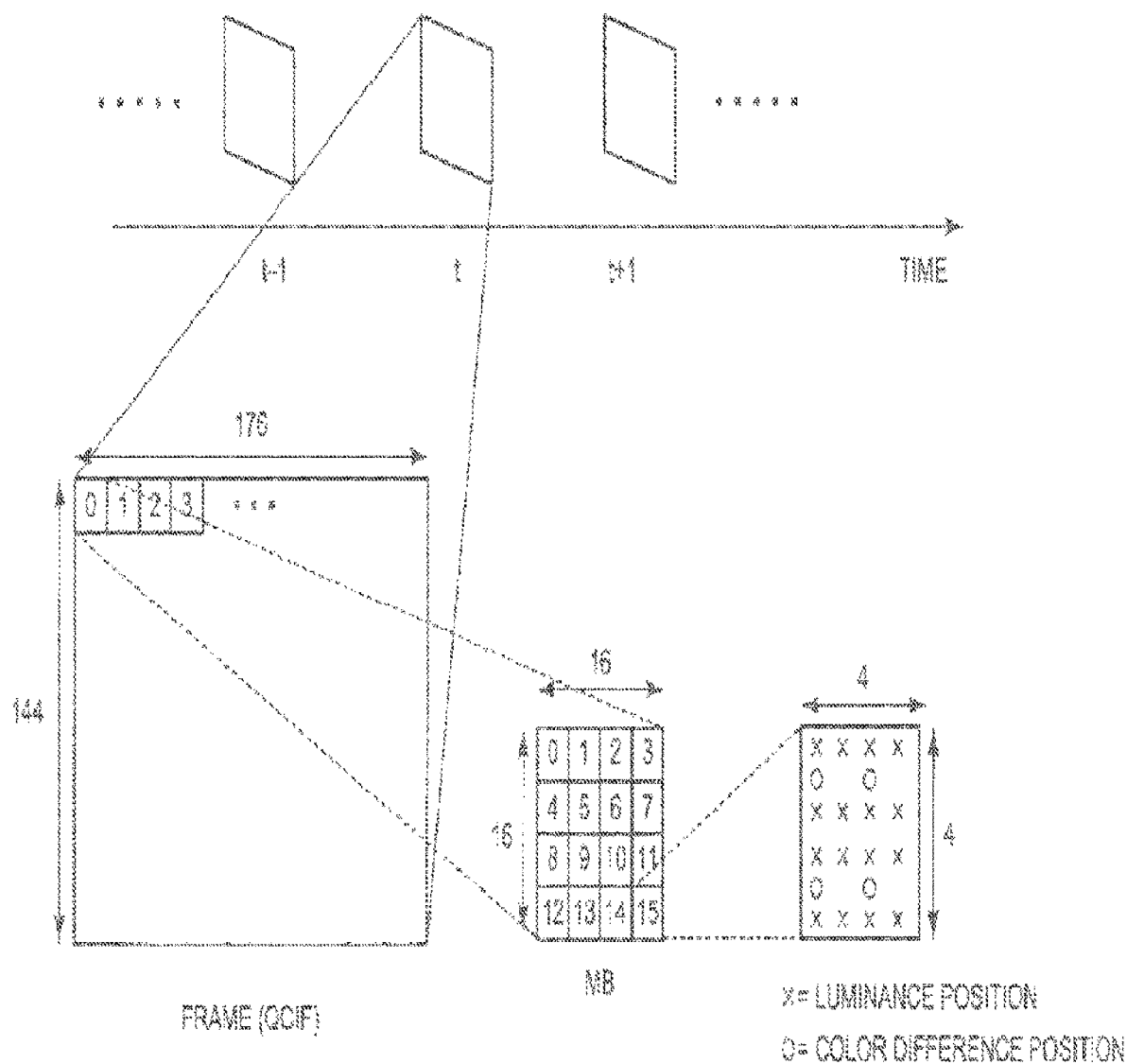
FIG. 23 It depicts an explanatory diagram showing an example of block division.

FIG. 22 is a flowchart showing characteristic steps in a video decoding method according to the present invention. As shown in FIG. 22, the video decoding method includes step S21 for determining a prediction direction of intra-frame prediction, step S22 for generating a prediction image using intra-frame prediction, and step S23 for predicting a quantization step size using the prediction direction of intra-frame prediction.

Part or all of the aforementioned exemplary embodiments can be described as Supplementary notes mentioned below, but the structure of the present invention is not limited to the following structures.

(Supplementary Note 1)

A video encoding device for dividing input image data into blocks of a predetermined size, and applying quantization to each divided image block to execute a compressive encoding process, comprising quantization step size encoding means for encoding a quantization step size that controls the granularity of quantization, and prediction image generation means for using an image encoded in the past and a predetermined parameter to generate a prediction image of an image block to be encoded, the quantization step size encoding means for predicting the quantization step size by using the parameter used by the prediction image generation means, wherein the prediction image generation means generates the prediction image by using at least inter-frame prediction, and the quantization step size encoding means uses a motion vector of the inter-frame prediction to predict the quantization step size.

(Supplementary Note 2)

A video encoding device for dividing input image data into blocks of a predetermined size, and applying quantization to each divided image block to execute a compressive encoding process, comprising quantization step size encoding means for encoding a quantization step size that controls the granularity of quantization, and prediction image generation means for generating a prediction image of an image block to be encoded by using an image encoded in the past and a predetermined parameter, the quantization step size encoding means for predicting the quantization step size by using the parameter used by the prediction image generation means, wherein the quantization step size encoding means predicts the quantization step size by using a quantization step size assigned to a neighboring image block already encoded, the prediction image generation means generates the prediction image by using at least inter-frame prediction, predicted motion vector generation means for predicting a motion vector used for inter-frame prediction by using a motion vector assigned to the neighboring image block already encoded is further comprised, and the quantization step size encoding means uses a prediction direction of the predicted motion vector to predict the quantization step size.

(Supplementary Note 3)

A video decoding device for decoding image blocks using inverse quantization of input compressed video data to execute a process of generating image data as a set of the image blocks, comprising quantization step size decoding means for decoding a quantization step size that controls a granularity of inverse quantization, and prediction image generation means for generating a prediction image of an image block to be decoded by using an image decoded in the past and a predetermined parameter, the quantization step size decoding means for predicting the quantization step size by using the parameter assigned to a neighboring image block already decoded, wherein the quantization step size decoding means predicts the quantization step size by using the parameter used to generate the prediction image, the prediction image generation means generates the prediction image by using at least inter-frame prediction, and the quantization step size decoding means uses a motion vector of the inter-frame prediction to predict the quantization step size.

(Supplementary Note 4)

A video decoding device for decoding image blocks using inverse quantization of input compressed video data to execute a process of generating image data as a set of the image blocks, comprising quantization step size decoding means for decoding a quantization step size that controls the granularity of inverse quantization, and prediction image generation means for generating a prediction image of an image block to be decoded by using an image decoded in the past and a predetermined parameter, the quantization step size decoding means for predicting the quantization step size by using a quantization step size assigned to a neighboring image already decoded, wherein the quantization step size decoding means predicts the quantization step size using the prediction image used to generate the prediction image, the prediction image generation means generates the prediction image using at least inter-frame prediction, predicted motion vector generation means for using a motion vector assigned to the neighboring image block already encoded to predict a motion vector used for inter-frame prediction is further comprised, and the quantization step size decoding means uses a prediction direction of the predicted motion vector to predict the quantization step size.

(Supplementary Note 5)

A video encoding method for dividing input image data into blocks of a predetermined size, and applying quantization to each divided image block to execute a compressive encoding process, comprising a step of predicting a quantization step size that controls the granularity of quantization using a quantization step size assigned to a neighboring image block already encoded, and a step of to generating a prediction image of an image block to be encoded by using an image encoded in the past and a predetermined parameter, wherein the quantization step size is predicted by using the parameter used to generate the prediction image.

(Supplementary Note 6)

The video encoding method according to Supplementary note 5, wherein the prediction image is generated using at least intra-frame prediction in the step of generating the prediction image, and a prediction direction of the intra-frame prediction is used to predict the quantization step size.

(Supplementary Note 7)

The video encoding method according to Supplementary note 5, wherein the prediction image is generated using at least inter-frame prediction in the step of generating the prediction image, and a motion vector of the inter-frame prediction is used to predict the quantization step size.

(Supplementary Note 8)

The video encoding method according to Supplementary note 5, the prediction image is generated using at least inter-frame prediction in the step of generating the prediction image, a step of using a motion vector assigned to a neighboring image block already encoded to a predict a motion vector used for inter-frame prediction is comprised, and a prediction direction of the predicted motion vector is used to predict the quantization step size.

(Supplementary Note 9)

A video encoding method for decoding image blocks using inverse quantization of input compressed video data to execute a process of generating image data as a set of the image blocks, comprising a step of predicting a quantization step size that controls the granularity of inverse quantization by using a quantization step size assigned to a neighboring image block already decoded, and a step of generating a prediction image using at least inter-frame prediction, wherein a motion vector of the inter-frame prediction is used to predict the quantization step size.

(Supplementary Note 10)

A video decoding method for decoding image blocks using inverse quantization of input compressed video data to execute a process of generating image data as a set of the image blocks, comprising a step of predicting a quantization step size that controls the granularity of inverse quantization by using a quantization step size assigned to a neighboring image block already decoded, and a step of generating a prediction image using at least inter-frame prediction, a motion vector assigned to a neighboring image block already encoded is used to predict a motion vector is used for inter-frame prediction, and a prediction direction of the predicted motion vector is used to predict the quantization step size.

(Supplementary Note 11)

A video encoding program used in a video encoding device for dividing input image data into blocks of a predetermined size, and applying quantization to each divided image block to execute a compressive encoding process, causing a computer to use a quantization step size assigned to a neighboring image block already encoded in order to predict a quantization step size that controls the granularity of quantization.

(Supplementary Note 12)

The video encoding program according to Supplementary note (11), causing the computer to use an image encoded in the past and a predetermined parameter to execute a process of generating a prediction image of an image block to be encoded in order to predict the quantization step size using the parameter used to generate the prediction image.

(Supplementary Note 13)

The video encoding program according to Supplementary note (12), causing the computer to execute the process of generating the prediction image using at least intra-frame prediction in order to predict the quantization step size using a prediction direction of the intra-frame prediction.

(Supplementary Note 14)

The video encoding program according to Supplementary note (12), causing the computer to execute the process of generating the prediction image using at least inter-frame prediction in order to predict the quantization step size using a motion vector of the inter-frame prediction.

(Supplementary Note 15)

The video encoding program according to Supplementary note (12), causing the computer to execute the process of generating the prediction image using at least inter-frame prediction and a process of using a motion vector assigned to a neighboring image block already encoded to predict a motion vector used in inter-frame prediction in order to predict the quantization step size using a prediction direction of the predicted motion vector.

(Supplementary Note 16)

A video decoding program used in a video decoding device for decoding image blocks using inverse quantization of input compressed video data to execute a process of generating image data as a set of the image blocks, causing a computer to use a quantization step size assigned to a neighboring image block already decoded in order to predict a quantization step size that controls the granularity of inverse quantization.

(Supplementary Note 17)

The video decoding program according to Supplementary note (16), causing the computer to execute a process of using an image decoded in the past and a predetermined parameter to generate a prediction image of an image block to be decoded in order to predict the quantization step size using the parameter used to generate the prediction image.

(Supplementary Note 18)
The video decoding program according to Supplementary note (17), causing the computer to execute the process of generating the prediction image using at least intra-frame prediction in order to predict the quantization step size using a prediction direction of the intra-frame prediction.
(Supplementary Note 19)
The video decoding program according to Supplementary note (17), causing the computer to execute the process of generating the prediction image using at least inter-frame prediction in order to predict the quantization step size using a motion vector of the inter-frame prediction.
(Supplementary Note 20)
The video decoding program according to Supplementary note (17), causing the computer to execute the process of generating the prediction image using at least inter-frame prediction and a process of using a motion vector assigned to a neighboring image block already encoded to predict a motion vector used in inter-frame prediction in order to predict the quantization step size using a prediction direction of the predicted motion vector.
(Supplementary Note 21)
A video encoding device for dividing input image data into blocks of a predetermined size, and applying quantization to each divided image block to execute a compressive encoding process, comprising quantization step size encoding means for encoding a quantization step size that controls the granularity of quantization; prediction image generation means for generating a prediction image of an image block to be encoded by using an image encoded in the past and a predetermined parameter, wherein the quantization step size encoding means predicts the quantization step size using the parameter used by the prediction image generation means; quantization step size prediction control means for controlling the operation of the quantization step size encoding means based on the predetermined parameter; and multiplexing means for multiplexing an operational parameter of the quantization step size encoding means into the result of the compressive encoding process.
(Supplementary Note 22)
The video encoding device according to Supplementary note 21, wherein the operational parameter of the quantization step size encoding means includes at least a flag representing whether to use the parameter used by the prediction image generation means or not, and the quantization step size prediction control means controls the operation of the quantization step size encoding means based on the flag.
(Supplementary Note 23)
The video encoding device according to Supplementary note 21, wherein the operational parameter of the quantization step size encoding means comprises at least a modulation parameter of the quantization step size, and the quantization step size encoding means uses the modulation parameter to modulate the quantization step size determined based on the parameter used by the prediction image generation means in order to predict the quantization step size.
(Supplementary Note 24)
The video encoding device according to Supplementary note 23, wherein the quantization step size encoding means adds a predetermined offset to the quantization step size determined based on the parameter used by the prediction image generation means in order to predict the quantization step size.
(Supplementary Note 25)
A video decoding device for decoding image blocks using inverse quantization of input compressed video data to execute a process of generating image data as a set of the image blocks, comprising: quantization step size decoding means for decoding a quantization step size that controls the granularity of inverse quantization; prediction image generation means for using an image decoded in the past and a predetermined parameter to generate a prediction image of an image block to be decoded wherein the quantization step size decoding means uses a quantization step size assigned to a neighboring image block already decoded to predict the quantization step size; de-multiplexing mean for de-multiplexing a bitstream including an operational parameter of the quantization step size decoding means; and quantization step size prediction control means for controlling the operation of the quantization step size decoding means based on the de-multiplexed operational parameter of the quantization step size decoding means.
(Supplementary Note 26)
The video decoding device according to Supplementary note 25, wherein the de-multiplexing means extracts, as the operational parameter of the quantization step size decoding means, at least a flag representing whether to use the parameter used by the prediction image generation means, and the quantization step size prediction control means controls the operation of the quantization step size decoding means based on the flag.
(Supplementary Note 27)
The video decoding device according to Supplementary note 25, wherein the de-multiplexing means extracts, as the operational parameter of the quantization step size decoding means, at least a modulation parameter of the quantization step size, and the quantization step size decoding means uses the modulation parameter to modulate the quantization step size determined based on the parameter used by the prediction image generation means in order to predict the quantization step size.
(Supplementary Note 28)
The video decoding device according to Supplementary note 27, wherein the quantization step size decoding means adds a predetermined offset to the quantization step size determined based on the parameter used by the prediction image generation means in order to predict the quantization step size.
(Supplementary Note 29)
A video encoding method for dividing input image data into blocks of a predetermined size, and applying quantization to each divided image block to execute a compressive encoding process, comprising: encoding a quantization step size that controls the granularity of quantization; using an image encoded in the past and a predetermined parameter to generate a prediction image of an image block to be encoded; predicting the quantization step size using the parameter used in generating the prediction image; and multiplexing an operational parameter used in encoding the quantization step size into the result of the compressive encoding process.
(Supplementary Note 30)
The video encoding method according to Supplementary note 29, wherein the operational parameter used in encoding the quantization step size includes at least a flag representing whether to use the parameter upon generation of the prediction image in order to control an operation for encoding the quantization step size based on the flag.
(Supplementary Note 31)
The video encoding method according to Supplementary note 29, wherein the operational parameter used in encoding the quantization step size comprises at least a modulation parameter of the quantization step size, and upon encoding the quantization step size, the modulation parameter is used to modulate the quantization step size determined based on the parameter used in generating the prediction image in order to predict the quantization step size.
(Supplementary Note 32)
The video encoding method according to Supplementary note 31, wherein a predetermined offset is added to the quantization step size determined based on the parameter used in generating the prediction image to predict the quantization step size.
(Supplementary Note 33)
A video decoding method for decoding image blocks using inverse quantization of input compressed video data to execute a process of generating image data as a set of the image blocks, comprising: decoding a quantization step size that controls the granularity of inverse quantization; using an image decoded in the past and a predetermined parameter to generate a prediction image of an image block to be decoded; using a quantization step size assigned to a neighboring image block already decoded to predict the quantization step size upon decoding the quantization step size; de-multiplexing a bitstream including an operational parameter used in decoding the quantization step size, and controlling an operation for decoding the quantization step size based on the de-multiplexed operational parameter.
(Supplementary Note 34)
The video decoding method according to Supplementary note 33, wherein at least a flag representing whether to use the parameter used in generating the prediction image of the image block to be decoded is extracted as the operational parameter used in decoding the quantization step size, and the operation for decoding the quantization step size is controlled based on the flag.
(Supplementary Note 35)
The video decoding method according to Supplementary note 33, wherein at least a modulation parameter of the quantization step size is extracted as the operational parameter used in decoding the quantization step size, and the modulation parameter is used to modulate the quantization step size determined based on the parameter used in generating the prediction image of the image block to be decoded in order to predict the quantization step size.
(Supplementary Note 36)
The video decoding method according to Supplementary note 35, wherein upon decoding the quantization step size, a predetermined offset is added to the quantization step size determined based on the parameter used in generating the prediction image of the image block to be decoded in order to predict the quantization step size.
(Supplementary Note 37)
A video encoding program for dividing input image data into blocks of a predetermined size, and applying quantization to each divided image block to execute a compressive encoding process, causing a computer to execute: a process of encoding a quantization step size that controls the granularity of quantization; a process of using an image encoded in the past and a predetermined parameter to generate a prediction image of an image block to be encoded; a process of predicting the quantization step size using the parameter used in generating the prediction image; and multiplexing an operational parameter used in encoding the quantization step size into the result of the compressive encoding process.
(Supplementary Note 38)
The video encoding program according to Supplementary note 37, wherein the operational parameter used in encoding the quantization step size includes at least a flag representing whether to use the parameter upon generation of the prediction image, and the computer is caused to control an operation for encoding the quantization step size based on the flag.
(Supplementary Note 39)
The video encoding program according to Supplementary note 37, wherein the operational parameter used in encoding the quantization step size includes at least a modulation parameter of the quantization step size, and upon encoding the quantization step size, the computer is caused to use the modulation parameter to modulate the quantization step size determined based on the parameter used in generating the prediction image in order to predict the quantization step size.
(Supplementary Note 40)
The video encoding program according to Supplementary note 39, wherein the computer is caused to add a predetermined offset to the quantization step size determined based on the parameter used in generating the prediction image in order to predict the quantization step size.
(Supplementary Note 41)
A video decoding program for decoding image blocks using inverse quantization of input compressed video data to execute a process of generating image data as a set of the image blocks, causing a computer to execute: a process of decoding a quantization step size that controls the granularity of inverse quantization; a process of using an image decoded in the past and a predetermined parameter to generate a prediction image of an image block to be decoded; a process of using a quantization step size assigned to a neighboring image block already decoded to predict the quantization step size upon decoding the quantization step size; a process of de-multiplexing a bitstream including an operational parameter used in decoding the quantization step size, and a process of controlling an operation for decoding the quantization step size based on the de-multiplexed operational parameter.
(Supplementary Note 42)
The video decoding program according to Supplementary note 41, causing the computer to further execute: a process of extracting, as the operational parameter used in decoding the quantization step size, at least a flag representing whether to use the parameter used in generating the prediction image of the image block to be decoded; and a process of controlling an operation for decoding the quantization step size based on the flag.
(Supplementary Note 43)
The video decoding program according to Supplementary note 41, causing the computer to further execute: a process of extracting, as the operational parameter used in decoding the quantization step size, at least a modulation parameter of the quantization step size; and a process of using the modulation parameter to modulate the quantization step size determined based on the parameter used in generating the prediction image of the image block to be decoded in order to predict the quantization step size.
(Supplementary Note 44)
The video decoding program according to Supplementary note 43, wherein upon decoding the quantization step size, the computer is caused to add a predetermined offset to the quantization step size determined based on the parameter used in generating the prediction image of the image block to be decoded in order to predict the quantization step size.
(Supplementary Note 45)
A video encoding device for dividing input image data into blocks of a predetermined size, and applying quantization to each divided image block to execute a compressive encoding process, comprising quantization step size encoding means for encoding a quantization step size that controls the granularity of quantization, wherein the quantization step size encoding means predicts the quantization step size that controls the granularity of quantization by using an average value of quantization step sizes assigned to multiple neighboring image blocks already encoded.

(Supplementary Note 46)

A video decoding device for decoding image blocks using inverse quantization of input compressed video data to execute a process of generating image data as a set of the image blocks, comprising quantization step size decoding means for decoding a quantization step size that controls the granularity of inverse quantization, wherein the quantization step size decoding means predicts the quantization step size that controls the granularity of inverse quantization by using an average value of quantization step sizes assigned to multiple neighboring image blocks already encoded.

(Supplementary Note 47)

A video encoding method for dividing input image data into blocks of a predetermined size, and applying quantization to each divided image block to execute a compressive encoding process, comprising using an average value of quantization step sizes assigned to multiple neighboring image blocks already encoded to predict a quantization step size that controls the granularity of quantization.

(Supplementary Note 48)

A video decoding method for decoding image blocks using inverse quantization of input compressed video data to execute a process of generating image data as a set of the image blocks, comprising using an average value of quantization step sizes assigned to multiple neighboring image blocks already decoded to predict a quantization step size that controls the granularity of inverse quantization.

(Supplementary Note 49)

A video encoding program for dividing input image data into blocks of a predetermined size, and applying quantization to each divided image block to execute a compressive encoding process, causing a computer to execute: a process of encoding a quantization step size that controls the granularity of quantization; and a process of using an average value of quantization step sizes assigned to multiple neighboring image blocks already encoded to predict the quantization step size that controls the granularity of quantization.

(Supplementary Note 50)

A video decoding program for decoding image blocks using inverse quantization of input compressed video data to execute a process of generating image data as a set of the image blocks, causing a computer to execute: a process of decoding a quantization step size that controls the granularity of inverse quantization; and a process of using an average value of quantization step sizes assigned to multiple neighboring image blocks already decoded to predict the quantization step size that controls the granularity of inverse quantization.

While the present invention has been described with reference to the exemplary embodiments and examples, the present invention is not limited to the aforementioned exemplary embodiments and examples. Various changes understandable to those skilled in the art within the scope of the present invention can be made to the structures and details of the present invention.

This application claims priority based on Japanese Patent Application No. 2011-51291, filed on Mar. 9, 2011, and Japanese Patent Application No. 2011-95395, filed on Apr. 21, 2011, the disclosures of which are incorporated herein in their entirety.

REFERENCE SIGNS LIST 10 quantization step size encoding unit
11 step size prediction unit
20 prediction image generation unit
30 predicted motion vector generation unit
50 quantization step size decoding unit
51 step size prediction unit
60 prediction image generation unit
70 predicted motion vector generation unit
101 frequency transformer
102 quantizer
103 variable-length encoder
104 quantization controller
105 inverse quantizer
106 inverse frequency transformer
107 frame memory
108 intra-frame predictor
109 inter-frame predictor
110 prediction selector
111 quantization step size prediction controller
112 multiplexer
201 variable-length decoder
202 inverse quantizer
203 inverse frequency transformer
204 frame memory
205 intra-frame predictor
206 inter-frame predictor
207 prediction selector
208 de-multiplexer
209 quantization step size prediction controller
1001 processor
1002 program memory
1003 storage medium
1004 storage medium
10311 quantization step size buffer
10312 entropy encoder
10313 predicted quantization step size generator
20111 entropy decoder
20112 quantization step size buffer
20113 predicted quantization step size generator

The invention claimed is:

1. A video decoding device, comprising:
at least one memory storing instructions; and
at least one hardware processor configured to execute the instructions to implement:
  acquiring a mean value of at least a quantization step size assigned to a leftwardly adjacent neighboring image block already decoded and a quantization step size assigned to an upwardly adjacent neighboring image block already decoded,
  acquiring a second quantization step size that is assigned to an image block decoded immediately before and controls a granularity of an inverse quantization,
  selecting the mean value of at least the quantization step size assigned to a leftwardly adjacent neighboring image block already decoded and the quantization step size assigned to an upwardly adjacent neighboring image block already decoded or the second quantization step size assigned to an image block decoded immediately before, and
  calculating a quantization step size based on the selected quantization step size.

2. A video decoding method, comprising:
acquiring a mean value of at least a quantization step size assigned to a leftwardly adjacent neighboring image block already decoded and a quantization step size assigned to an upwardly adjacent neighboring image block already decoded, acquiring a second quantization step size that is assigned to an image block decoded immediately before and controls a granularity of an inverse quantization, selecting the mean value of at least the quantization step size assigned to a leftwardly adjacent neighboring image block already decoded and the quantization step size assigned to an upwardly adjacent neighboring image block already decoded or the second quantization step size assigned to an image block decoded immediately before, and calculating a quantization step size based on the selected quantization step size.

* * * * *